United States Patent
Canich et al.

(10) Patent No.: US 9,458,260 B2
(45) Date of Patent: Oct. 4, 2016

(54) PROCESS USING SUBSTITUTED METALLOCENE CATALYSTS AND PRODUCTS THEREFROM

(71) Applicant: ExxonMobil Chemical Patents Inc., Baytown, TX (US)

(72) Inventors: Jo Ann M. Canich, Houston, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/325,474

(22) Filed: Jul. 8, 2014

(65) Prior Publication Data

US 2015/0025210 A1 Jan. 22, 2015

Related U.S. Application Data

(60) Provisional application No. 61/847,442, filed on Jul. 17, 2013, provisional application No. 61/847,464, filed on Jul. 17, 2013.

(51) Int. Cl.
*C08F 4/6592* (2006.01)
*C08F 210/06* (2006.01)
*C08F 210/02* (2006.01)
*C08F 10/06* (2006.01)
*C08F 4/659* (2006.01)

(52) U.S. Cl.
CPC ............ *C08F 10/06* (2013.01); *C08F 4/6592* (2013.01); *C08F 4/65912* (2013.01); *C08F 4/65927* (2013.01); *C08F 210/02* (2013.01); *C08F 210/06* (2013.01)

(58) Field of Classification Search
CPC ............ C08F 4/65927; C08F 4/65912; C08F 210/06; C08F 210/02
See application file for complete search history.

(56) References Cited

U.S. PATENT DOCUMENTS

| | | |
|---|---|---|
| 4,814,540 A | 3/1989 | Watanabe et al. |
| 5,049,535 A | 9/1991 | Resconi et al. |
| 5,276,208 A | 1/1994 | Winter et al. |
| 5,278,264 A | 1/1994 | Spaleck et al. |
| 5,304,614 A | 4/1994 | Winter et al. |
| 5,459,117 A | 10/1995 | Ewen |
| 5,532,396 A | 7/1996 | Winter et al. |
| 5,543,373 A | 8/1996 | Winter et al. |
| 5,585,509 A | 12/1996 | Langhauser et al. |
| 5,631,202 A | 5/1997 | Ewen |
| 5,667,408 A | 9/1997 | Broschard et al. |
| 5,696,045 A | 12/1997 | Winter et al. |
| 5,700,886 A | 12/1997 | Winter et al. |
| 5,739,366 A | 4/1998 | Imuta et al. |
| 5,767,033 A | 6/1998 | Imuta et al. |
| 5,770,753 A | 6/1998 | Küber et al. |
| 5,786,432 A | 7/1998 | Küber et al. |
| 5,840,644 A | 11/1998 | Küber et al. |
| 5,869,584 A | 2/1999 | Winter et al. |
| 6,051,727 A | 4/2000 | Küber et al. |
| 6,057,408 A | 5/2000 | Winter et al. |
| 6,121,182 A | 9/2000 | Okumura et al. |
| 6,136,743 A | 10/2000 | Sugimura et al. |
| 6,150,481 A | 11/2000 | Winter et al. |
| 6,242,544 B1 | 6/2001 | Küber et al. |
| 6,255,506 B1 | 7/2001 | Küber et al. |
| 6,355,819 B1 | 3/2002 | Leino et al. |
| 6,399,533 B2 | 6/2002 | Sacchetti et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,787,618 B1 | 9/2004 | Winter et al. |
| 6,841,501 B2 | 1/2005 | Resconi et al. |
| 6,878,786 B2 | 4/2005 | Resconi et al. |
| 6,949,614 B1 | 9/2005 | Schottek et al. |
| 6,953,829 B2 | 10/2005 | Kratzer et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,220,695 B2 | 5/2007 | Casty et al. |
| 7,314,903 B2 | 1/2008 | Resconi et al. |
| 7,342,078 B2 | 3/2008 | Schottek et al. |
| 7,385,015 B2 | 6/2008 | Holtcamp |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,741,417 B2 | 6/2010 | Casty et al. |
| 7,799,880 B2 | 9/2010 | Ciaccia |

(Continued)

FOREIGN PATENT DOCUMENTS

| | | |
|---|---|---|
| CN | 101074276 A | 11/2007 |
| EP | 0 576 970 | 1/1994 |

(Continued)

OTHER PUBLICATIONS

U.S. Appl. No. 14/325,449, filed Jul. 8, 2014, Canich et al.

(Continued)

*Primary Examiner* — Caixia Lu

(57) ABSTRACT

This invention relates to a process to produce propylene polymer using a bridged hafnium transition metal metallocene catalyst compounds having two indenyl ligands substituted at the 4 positions with a $C_1$ to $C_{10}$ alkyl, where the 3 positions are hydrogen (assuming the bridge position is counted as the one position) and the bridging atom is carbon or silicon which is incorporated into a cyclic group comprising 3, 4, 5, or 6 silicon and/or carbon atoms that make up the cyclic ring, where the propylene polymer has 1) greater than 40% vinyl chain ends, relative to the total unsaturated chain ends, 2) a Tm of 70° C. or more; an Mw of 3000 to 300,000 g/mol, and 4) a $g'_{vis}$ of 0.90 or less.

22 Claims, 1 Drawing Sheet

(56) References Cited

U.S. PATENT DOCUMENTS

| | | | |
|---|---|---|---|
| 7,829,495 | B2 | 11/2010 | Floyd et al. |
| 7,964,679 | B2 | 6/2011 | Resconi et al. |
| 7,985,799 | B2 | 7/2011 | Resconi et al. |
| 8,008,653 | B2 | 8/2011 | Lee et al. |
| 8,222,356 | B2 | 7/2012 | Kipke et al. |
| 2002/0019504 | A1 | 2/2002 | Sunaga et al. |
| 2002/0103312 | A1 | 8/2002 | Rausch et al. |
| 2003/0120015 | A1 | 6/2003 | Resconi et al. |
| 2003/0149199 | A1 | 8/2003 | Schottek et al. |
| 2004/0132933 | A1 | 7/2004 | Crowther et al. |
| 2004/0132935 | A1 | 7/2004 | Arjunan et al. |
| 2005/0182266 | A1 | 8/2005 | Schulte et al. |
| 2005/0228155 | A1 | 10/2005 | Kawai et al. |
| 2005/0261449 | A1 | 11/2005 | Voskoboynikov et al. |
| 2006/0116490 | A1 | 6/2006 | Paczkowski et al. |
| 2009/0259007 | A1 | 10/2009 | Ciaccia |
| 2010/0249346 | A1 | 9/2010 | Schiendorfer et al. |
| 2010/0261860 | A1 | 10/2010 | Schulte et al. |
| 2010/0267907 | A1 | 10/2010 | Dimeska et al. |
| 2011/0230630 | A1 | 9/2011 | Sell et al. |
| 2012/0095157 | A1 | 4/2012 | Jiang et al. |
| 2013/0085232 | A1 | 4/2013 | Stewart |
| 2013/0150541 | A1 | 6/2013 | Crowther et al. |

FOREIGN PATENT DOCUMENTS

| | | |
|---|---|---|
| EP | 812 854 | 12/1997 |
| EP | 1 209 165 | 5/2002 |
| EP | 1 520 863 | 6/2005 |
| JP | 53-37644 | 4/1978 |
| JP | 55-10599 | 3/1980 |
| JP | 08-0239416 | 9/1996 |
| RU | 2160276 | 12/2000 |
| WO | WO 97/40075 | 10/1997 |
| WO | wo98/46616 | 10/1998 |
| WO | wo00/068279 | 11/2000 |
| WO | WO 01/48034 | 7/2001 |
| WO | WO 02/02575 | 1/2002 |
| WO | WO 02/02576 | 1/2002 |
| WO | WO 03/002583 | 1/2003 |
| WO | WO 03/045551 | 6/2003 |
| WO | wo03/050131 | 6/2003 |
| WO | wo2004/017602 | 2/2004 |
| WO | wo2007/070040 | 6/2007 |
| WO | WO 2008/027116 | 3/2008 |
| WO | wo2010/077230 | 7/2010 |
| WO | WO 2011/051705 | 5/2011 |
| WO | wo2012/134715 | 10/2012 |
| WO | wo2015/009479 | 1/2015 |

OTHER PUBLICATIONS

Caldwell et al., "*Are Perpendicular Alkene Triplets Just 1,2-Biradicals? Studies with the Cyclopropylcarbinyl Clock*", Journal of the American Chemical Society, Mar. 1994, vol. 116, No. 6, pp. 2271-2275.

Deng et al., "*Nickel-catalyzed Carboannulation Reaction of o-Bromobenzyl Zinc Bromide with Unsaturated Compounds*", Organic Letters, 2007, vol. 9, No. 25, pp. 5207-5210.

dE Meijere et al., "*An Efficient Three-Step Synthesis of Cyclpenta[b]pyrans via 2-Donor-Substituted Fischer Ethenylcarbenechromium Complexes*", Chemistry: A European Journal, 2005, Wiley-VCH Verlag GmbH & Co. KGaA, Weinheim, vol. 11, pp. 4132-4148.

Izmer et al., "*Synthesis and Molecular Structures of Zirconium and Hafnium Complexes Bearing Dimethylsilandiyl-bis-2,4,6-trimethylindenyl and Dimethylsilandiyl-bis-2-methyl-4,6-diisopropylindenyl Ligands*", Journal of Organometallic Chemistry (2005), vol. 690, Issue 4, pp. 1067-1079.

Kaneyoshi, H. et al., "*Synthesis of Block and Graft Copolymers with Linear Polyethylene Segments by Combination of Degenerative Transfer Coordination Polymerization and Atom Transfer Radical Polymerization*," Macromolecules, vol. 38, Issue 13, 2005, pp. 5425-5435.

Mochalov et al., "*Transformations of Arylcyclopropanes Under the Action of Dinitrogen Tetroxide*", Journal of Organic Chemistry of the USSR (Translation of Zhurnal Organicheskoi Khimii) (1998), vol. 34, Issue 9, pp. 1322-1330.

Mochalov et al., "*Nitration of Biphenylcyclopropanes*", Journal of Organic Chemistry of the USSR (Zhurnal Organicheskoi Khimii), May 1976, vol. 12, Issue 5, pp. 1008-1014.

Ransom et al., "*Synthesis and Molecular Structures of Zirconium and Hafnium Complexes Bearing Dimethylsilandiyl-bis-2,4,6-trimethylindenyl and Dimethylsilandiyl-bis-2-methyl-4,6-diisopropylindenyl Ligands*", Organometallics (2011), vol. 30, Issue 4, pp. 800-814.

Riemschneider et al., "*Chemistry of Polyhalocyclopentadienes and Related Compounds. XVII. Reaction of Hexachlorocyclopentadiene with Unsaturated Compounds*", Monatshefte fuer Chemie, 1960, vol. 91, Issue 1, pp. 22-40. (English language abstract attached.).

Rulhoff et al., "*Synthesis and Characterization of Propylene and Linear Ethylene Oligomers ($C_n=26-28$) with Metallocenes/MAO Catalysts*," Macromolecular Chemistry and Physics, vol. 207, Issue 16, 2006, pp. 1450-1460.

Shabarov et al., "*Reaction of 2-cyclpropylfluorene with Mercury Acetate*", Vestnik Moskovskogo Universiteta, Seriya 2: Khimiya, Moscow University Chemistry Bulletin, 1976, vol. 17, Issue 5, pp. 620-621.

Waugh et al., "*Upper Excited State Photochemistry: Solution and Gas Phase Photochemistry and Photophysics of 2- and 3-Cyclopropylindene[1]* ", Journal of the American Chemical Society, Mar. 1999, vol. 121, Issue 13, pp. 3083-3092.

Yoshida, Z., "*Novel Pi Systems Possessing Cyclopropenylidene Moiety*", Pure & Applied Chemistry, vol. 54, No. 5 (1982), pp. 1059-1074.

Resconi, L. et al., Olefin polymerization at Bis(pentamethylcyclopentadienyl)-zirconium and-hafnium Centers: Chain-Transfer Mechanisms, J. Am. Chem. Soc., Jan. 1992, vol. 114, No. 3, pp. 1025-1032.

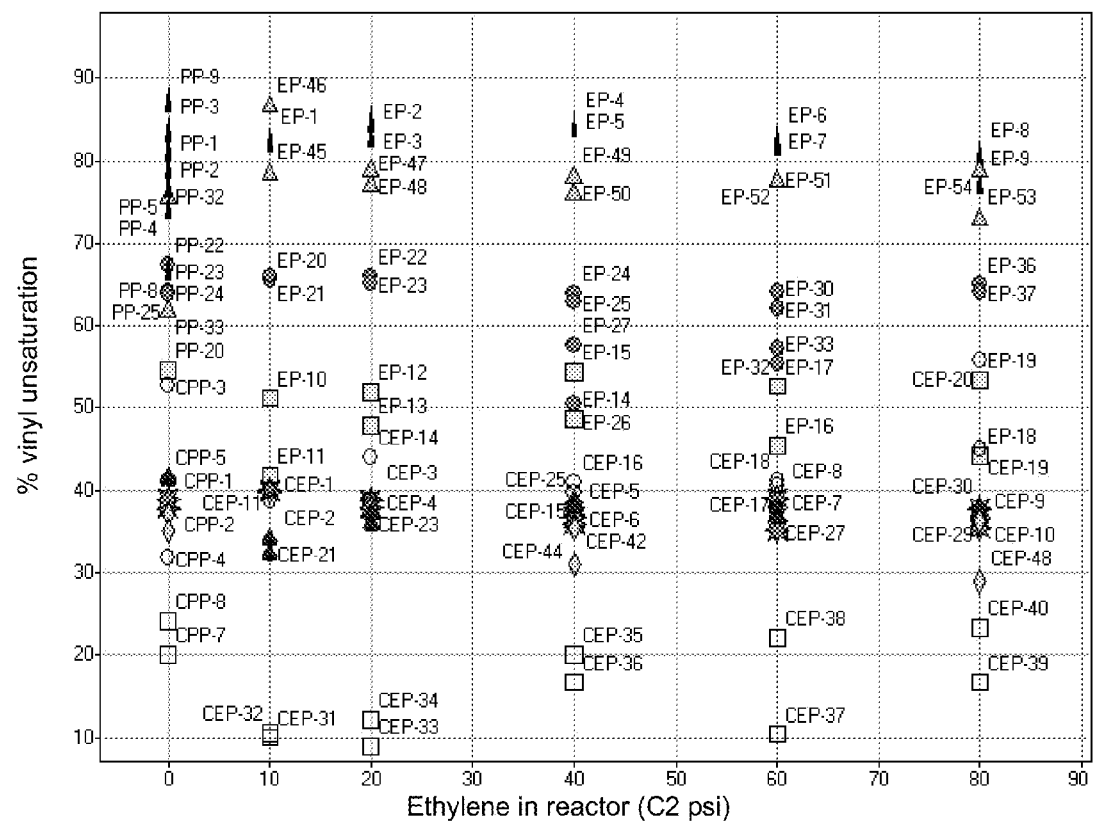

PROCESS USING SUBSTITUTED METALLOCENE CATALYSTS AND PRODUCTS THEREFROM

PRIORITY

This application claims priority to and the benefit of U.S. Ser. No. 61/847,442, filed Jul. 17, 2013 and to U.S. Ser. No. 61/847,464, filed Jul. 17, 2013.

FIELD OF THE INVENTION

This invention relates to the use of bridged hafnium metallocene compounds comprising indenyl ligands substituted at the 4 position capable of producing vinyl terminated polymers and the polymers so produced.

BACKGROUND OF THE INVENTION

Alpha-olefins, especially those containing about 6 to about 20 carbon atoms, have been used as intermediates in the manufacture of detergents or other types of commercial products. Such alpha-olefins have also been used as comonomers, especially in linear low density polyethylene. Commercially produced alpha-olefins are typically made by oligomerizing ethylene. Longer chain alpha-olefins, such as vinyl-terminated polyethylenes are also known and can be useful as building blocks following functionalization or as macromonomers.

Allyl terminated low molecular weight solids and liquids of ethylene or propylene have also been produced, typically for use as branches in polymerization reactions. See, for example, Rulhoff, Sascha and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules, 16, 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mns and do not have at least 93% allylic vinyl unsaturation. Likewise, these oligomers lack comonomer and are produced at low productivities with a large excess of alumoxane (molar ratio≥600 Al/M; M=Zr, Hf). Additionally, no less than 60 wt % solvent (solvent+propylene basis) is present in all of the examples.

Teuben, et al. (J. Mol. Catal., 62, 1990, pp. 277-287) discloses the use of [Cp*$_2$MMe(THT)]+[BPh$_4$] (M=Zr and Hf; Cp*=pentamethylcyclopentadienyl; Me=methyl, Ph=phenyl; THT=tetrahydrothiophene), to make propylene oligomers. For M=Zr, a broad product distribution with oligomers up to $C_{24}$ (number average molecular weight (Mn) of 336) was obtained at room temperature. Whereas, for M=Hf, only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang, et al. (Angew. Chem. Intl Ed. Engl., 31, 1992, pp. 1375) discloses amorphous, low molecular weight polypropylene made at low temperatures where the reactions showed low activity and product having 90% allylic vinyls, relative to all unsaturations, by $^1$H NMR. Thereafter, Resconi, et al. (J. Am. Chem. Soc., 114, 1992, pp. 1025-1032), discloses the use of bis(pentamethylcyclopentadienyl)zirconium and bis(pentamethylcyclopentadienyl)hafnium to polymerize propylene and obtained beta-methyl termination resulting in oligomers and low molecular weight polymers with "mainly allyl- and iso-butyl-terminated" chains. As is the case in U.S. Pat. No. 4,814,540, the oligomers produced do not have at least 93% allyl chain ends, an Mn of about 500 to about 20,000 g/mol (as measured by $^1$H NMR), and the catalyst has low productivity (1-12,620 g/mmol metallocene/hr; >3000 wppm Al in products).

Similarly, Small and Brookhart, (Macromolecules, 32, 1999, pp. 2322) disclose the use of a pyridylbisamido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm. 2000, 21, pp. 1103-1107) discloses materials with up to about 81% vinyl termination made using dimethylsilyl bis(2-methyl, 4-phenyl-indenyl) zirconium dichloride and methylalumoxane in toluene at about 120° C. The materials have a Mn of about 12,300 (measured with $^1$H NMR) and a melting point of about 143° C.

Markel et al. (Macromolecules, 33, 2000, pp. 8541-8548) discloses comb branch-block polyethylene made with $Cp_2ZrCl_2$ and $(C_5Me_4SiMe_2NC_{12}H_{23})TiCl_2$, activated with methyl alumoxane.

Moscardi et al. (Organometallics, 20, 2001, pp. 1918) discloses the use of rac-dimethylsilylmethylenebis(3-t-butyl indenyl)zirconium dichloride with methylalumoxane in batch polymerizations of propylene to produce materials where " . . . allyl end group always prevails over any other end groups, at any [propene]." In these reactions, morphology control was limited and approximately 60% of the chain ends are allylic.

Coates, et al. (Macromolecules, 38, 2005, pp. 6259) discloses preparation of low molecular weight syndiotactic polypropylene ([rrrr]=0.46-0.93) with about 100% allyl end groups using bis(phenoxyimine)titanium dichloride ((PHI)$_2$TiCl$_2$) activated with modified methyl alumoxane (MMAO; Al/Ti molar ratio=200) in batch polymerizations run between −20° C. and +20° C. for four hours. For these polymerizations, propylene was dissolved in toluene to create a 1.65 M toluene solution. Catalyst productivity was very low (0.95 to 1.14 g/mmol Ti/hr).

JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers that do not have a significant amount of amorphous material.

U.S. Pat. No. 6,897,261 discloses olefin graft copolymers obtained by copolymerizing an atactic branched macromonomer, wherein the macromonomer is derived from monomers selected from the group consisting of (1) propylene and (2) the combination of propylene and at least one selected from ethylene, alpha-olefins having from 4 to 20 carbon atoms, cyclic olefins and styrenes, and of which the propylene content falls between 0.1 mol % and 100 mol %, and which macromonomer satisfies the following (a) and (b): (a) its weight-average molecular weight (Mw) measured through gel permeation chromatography (GPC) falls between 400 and 200000; (b) its vinyl content is at least 70 mol % of all the unsaturated groups in the macromonomer, wherein the macromonomer satisfies each of the following (i), (ii), and (iii): (i) the ratio of the temperature dependency ($E_2$) of the macromonomer solution viscosity to the temperature dependency ($E_1$) of the solution viscosity of the linear polymer which has the same type of monomer, the same chemical composition and the same intrinsic viscosity as those of the macromonomer, $E_2/E_1$, satisfies the following relationship: $1.0 < E_2/E_1 < 2.5$.

Rose et al. (Macromolecules, 41, 2008, pp. 559-567) discloses poly(ethylene-co-propylene) macromonomers not having significant amounts of iso-butyl chain ends. Those were made with bis(phenoxyimine) titanium dichloride (($PHI)_2TiCl_2$) activated with modified methylalumoxane (MMAO; Al/Ti molar ratio range 150 to 292) in semi-batch polymerizations (30 psi propylene added to toluene at 0° C. for 30 min, followed by ethylene gas flow at 32 psi of over-pressure at about 0° C. for polymerization times of 2.3 to 4 hours to produce E-P copolymer having an Mn of about 4,800 to 23,300. In four reported copolymerizations, allylic chain ends decreased with increasing ethylene incorporation roughly according to the equation:

% allylic chain ends (of total unsaturations)=−0.95 (mol % ethylene incorporated)+100.

For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from $0.78 \times 10^2$ g/mmol Ti/hr to $4.62 \times 10^2$ g/mmol Ti/hr.

Prior to this work, Zhu, et al. (Macromolecules, 35, 2002, pp. 10062-10070 and Macromolecules Rap. Commun., 24, 2003, pp. 311-315) reported only low (~38%) vinyl terminated ethylene-propylene copolymer made with the constrained geometry metallocene catalyst [$C_5Me_4(SiMe_2N$-tert-butyl)$TiMe_2$ activated with $B(C_6F_5)_3$ and MMAO.

Janiak and Blank summarize a variety of work related to oligomerization of olefins (Macromol. Symp., 236, 2006, pp. 14-22).

U.S. Pat. No. 6,225,432 discloses branched polypropylene compositions which have improved melt strength and good processability. The branched polypropylene compositions have a polydispersity of less than 4.0 and a melt point greater than 90° C. The weight average branching index g of the polypropylene compositions is less than 0.95.

WO2012/134715 discloses a process to produce branched polypropylene compositions containing long chain branching and allylic chain ends, however, few polymerization examples contain greater than 50% allylic chain ends, and high polymerization temperatures (130 C) were required to produce polypropylene with 83% allylic end groups (ex. 59). Additionally, higher than 50% allylic chain ends was only accomplished when a very bulky activator was used. Use of the less bulky activator, dimethylanilinium tetrakis(pentafluorophenyl)borate produced polymers with more vinylidene unsaturation vs. vinyl unsaturation.

WO2009/155471, WO2012/134719, and WO2012/134720 discloses polypropylene homopolymers and/or ethylene-propylene copolymers with high levels of allylic chain ends, no crystallinity, and lower molecular weights. There is no mention of the polymers having long chain branching.

However, processes to make branched polyolefins having high amounts of allyl terminations on a commercial scale are not known. Accordingly, there is a need for new processes that produce allyl terminated branched polyolefins that have allyl termination present in high amounts (50% or more), particularly in high yields and with a wide range of molecular weights, that can be made at commercial rates (5,000 g/mmol/hr productivity or more). There is further a need for branched polyolefin reactive materials having high amounts of allyl termination which can be functionalized and used in additive applications or as blending components.

SUMMARY OF THE INVENTION

This invention relates to a process for polymerization, comprising: (i) contacting one or more monomers comprising propylene and optionally ethylene, with a catalyst system comprising a metallocene catalyst compound and an activator, wherein the metallocene catalyst compound is represented by the formula:

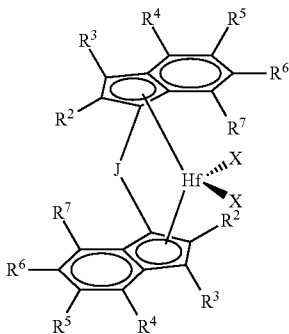

where each $R^3$ is hydrogen; each $R^4$ is independently a $C_1$-$C_{10}$ alkyl; each $R^2$ and $R^7$ is independently hydrogen, or $C_1$-$C_{10}$ alkyl, each $R^5$ and $R^6$ is independently hydrogen, $C_1$-$C_{50}$ substituted or unsubstituted hydrocarbyl, or $C_1$-$C_{50}$ substituted or unsubstituted halocarbyl; and $R^4$ and $R^5$, $R^5$ and $R^6$ and/or $R^6$ and $R^7$ may optionally be bonded together to form a ring structure; J is a bridging group represented by the formula $R^a{}_2J'$, where J' is C or Si, and each $R^a$ is, independently, $C_1$ to $C_{20}$ substituted or unsubstituted hydrocarbyl, and the two $R^a$ form a cyclic structure incorporating J' and the cyclic structure may be a saturated or partially saturated cyclic or fused ring system; and each X is a univalent anionic ligand, or two Xs are joined and bound to the metal atom to form a metallocycle ring, or two Xs are joined to form a chelating ligand, a diene ligand, or an alkylidene ligand; and (ii) obtaining a polymer having: 1) greater than 40% vinyl chain ends, relative to the total unsaturated chain ends, 2) a Tm of 70° C. or more; an Mw of 3000 to 300,000 g/mol, and 4) a $g'_{vis}$ of 0.90 or less.

This invention also relates to a polymer having: 1) greater than 40% vinyl chain ends, relative to the total unsaturated chain ends (preferably at least X % vinyl chain ends (relative to total unsaturations as measured by $^1$H NMR, where X=47.8*$g'_{vis}$+45.1), 2) a Tm of 70° C. or more; 3) an Mw of 3000 to 300,000 g/mol, and 4) a $g'_{vis}$ of 0.90 or less.

BRIEF DESCRIPTION OF THE FIGURES

FIG. 1 is a graph of pressure of ethylene (psi) introduced into the reactor versus amount of vinyl termination in the polymer produced. The labels within the graph correspond to the examples number in Table 1.

DEFINITIONS

As used herein, the numbering scheme for the Periodic Table Groups is the new notation as set out in CHEMICAL AND ENGINEERING NEWS, 63(5), 27 (1985). Therefore, a "group 4 metal" is an element from group 4 of the Periodic Table, e.g. Zr, Ti, and Hf.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

In some embodiments of the invention, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, butylphenyl, dibutylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For nomenclature purposes, the following numbering schemes are used for indenyl. It should be noted that indenyl can be considered a cyclopentadienyl with fused a benzene ring. The structure below is drawn and named as an anion.

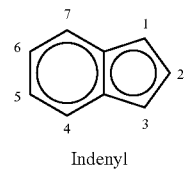

Indenyl

The following ring structures are substituted indenyls, where the substitution at the 5 and 6 positions forms a ring structure. For specific compound nomenclature purposes, these ligands are described below. A similar numbering and nomenclature scheme is used for these types of substituted indenyls that include indacenyls, cyclopenta[b]naphthalenyls, heterocyclopentanaphthyls, heterocyclopentaindenyls, and the like, as illustrated below. Each structure is drawn and named as an anion.

Non-limiting examples of indacenyls and cyclopenta[b]naphthalenyls include:

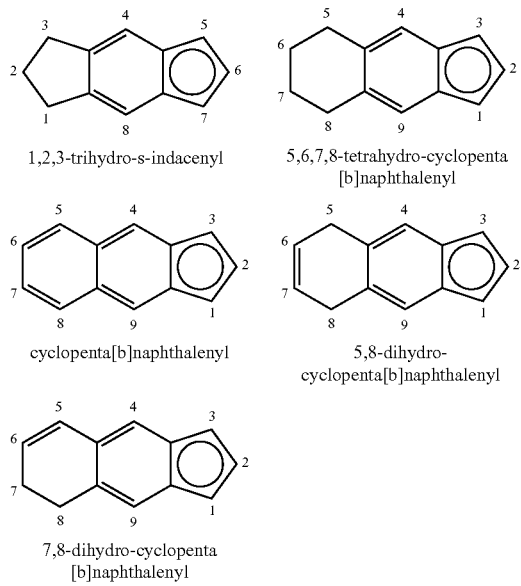

1,2,3-trihydro-s-indacenyl 5,6,7,8-tetrahydro-cyclopenta[b]naphthalenyl cyclopenta[b]naphthalenyl 5,8-dihydro-cyclopenta[b]naphthalenyl 7,8-dihydro-cyclopenta[b]naphthalenyl "Ring Structure" means atoms bonded together in one or more cyclic arrangements.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less). An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

In the context of this document, "homopolymerization" would produce a polymer made from one type of monomer. For example, homopolymerization of propylene would produce homopolypropylene; homopolymerization of ethylene would produce homopolyethylene; and the like. Likewise, "copolymerization" would produce polymers with more than one monomer type.

For the purposes of this invention, ethylene shall be considered an α-olefin.

An α-olefin may also include α-olefinic macromonomers of up to 2000 mer units.

The term "catalyst system" is defined to mean a catalyst precursor/activator pair, and optional co-activator, and an optional support material. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety. For the purposes of this invention and the claims thereto, when catalyst systems are described as comprising neutral stable forms of the components, it is well understood by one of ordinary skill in the art, that the ionic form of the component is the form that reacts with the monomers to produce polymers.

A transition metal compound may be neutral as in a precatalyst, or a charged species with a counter ion as in an activated catalyst system.

Catalyst precursor is also often referred to as precatalyst, catalyst, catalyst compound, catalyst precursor, transition metal compound or transition metal complex. These words are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be premixed with the transition metal compound to form an alkylated transition metal compound.

A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety such as indenyl) and more frequently two π-bound cyclopentadienyl moieties or substituted cyclopentadienyl moieties.

Noncoordinating anion (NCA) is defined to mean an anion either that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

A stoichiometric activator can be either neutral or ionic. The terms ionic activator, and stoichiometric ionic activator can be used interchangeably. Likewise, the terms neutral stoichiometric activator, and Lewis acid activator can be used interchangeably.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane.

The term "continuous" means a system that operates without interruption or cessation. For example a continuous process to produce a polymer would be one where the reactants are continually introduced into one or more reactors and polymer product is continually withdrawn.

For purposes of this invention, an "alkyl" group is a is a linear, branched, or cyclic radical of carbon and hydrogen. In a preferred embodiment, "alkyl" refers to linear alkyls.

Room temperature is 22° C., unless otherwise indicated.

DETAILED DESCRIPTION

Catalyst Systems

Catalysts useful herein include catalysts capable of producing oligomers with reactive polymerizable chain ends and capable of incorporating oligomers with polymerizable chain ends to form branched oligomers or polymers.

In the description herein, the catalyst may be described as a catalyst precursor, a pre-catalyst compound, a catalyst compound, or a transition metal compound, and these terms are used interchangeably. A polymerization catalyst system is a catalyst system that can polymerize monomers to polymer. A "catalyst system" is a combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of the embodiments and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The term "substituted" means that a hydrogen group has been replaced with a hydrocarbyl group, a heteroatom, or a heteroatom containing group. For example, methylcyclopentadiene (Cp) is a Cp group substituted with a methyl group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Particularly useful metallocene catalysts include novel bridged a hafnium transition metal metallocene catalyst compounds having two indenyl ligands substituted at the 4 positions with a $C_1$ to $C_{10}$ alkyl, where the 3 positions are hydrogen (assuming the bridge position is counted as the one position) and the bridge is carbon or silicon which is incorporated into a cyclic group comprising 3, 4, 5 or 6 silicon and/or carbon atoms that make up the cyclic ring, preferably the 2, 4 positions, 4, 7 positions, 2, 4, 5 positions, 2, 4, 6 positions, 2, 4, 7 positions, or 2, 4, 5, 6, 7 positions are substituted, preferably by a $C_1$ to $C_{10}$ alkyl group, and optionally, if alkyl substituted, the 4 and 5, 5 and 6, and/or 6 and 7 positions may be bonded together to form a ring structure.

In a preferred embodiment the metallocene catalyst compounds, and catalyst systems comprising such compounds, are represented by the formula:

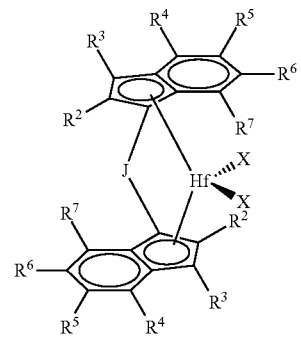

where each $R^3$ is hydrogen; each $R^4$ is independently a $C_1$-$C_{10}$ alkyl (preferably methyl, ethyl, propyl, butyl, pentyl, heptyl, hexyl, octyl, nonyl, decyl or an isomer thereof); each $R^2$, and $R^7$ are independently hydrogen, or $C_1$-$C_{10}$ alkyl (preferably hydrogen, methyl, ethyl, propyl, butyl, pentyl, heptyl, hexyl, octyl, nonyl, decyl or an isomer thereof); each $R^5$ and $R^6$ are independently hydrogen, or $C_1$-$C_{50}$ substituted or unsubstituted hydrocarbyl (preferably hydrogen, methyl, ethyl, propyl, butyl, pentyl, heptyl, hexyl, octyl, nonyl, decyl or an isomer thereof); and $R^4$ and $R^5$, $R^5$ and $R^6$ and/or $R^6$ and $R^7$ may optionally be bonded together to form a ring structure; J is a bridging group represented by the formula $R^a_2J$, where J is C or Si, and each $R^a$ is, independently $C_1$ to $C_{20}$ substituted or unsubstituted hydrocarbyl (preferably methyl, ethyl, propyl, butyl, pentyl, heptyl, hexyl, octyl, nonyl, decyl or an isomer thereof), and two $R^a$ form a cyclic structure incorporating J and the cyclic structure may be a saturated or partially saturated cyclic or fused ring system; and each X is a univalent anionic ligand, or two Xs are joined and bound to the metal atom to form a metallocycle ring, or two Xs are joined to form a chelating ligand, a diene ligand, or an alkylidene ligand.

In a preferred embodiment of the invention, each $R^2$ is independently a $C_1$ to $C_3$ alkyl group, preferably methyl, ethyl, n-propyl, isopropyl or cyclopropyl, each $R^3$, $R^5$, $R^6$, and $R^7$ are hydrogen, and each $R^4$ is independently a $C_1$ to $C_4$ alkyl group, preferably methyl, ethyl, n-propyl, cyclopropyl, or n-butyl.

In a preferred embodiment of the invention, each $R^2$ is a $C_1$ to $C_3$ alkyl group, preferably methyl, ethyl, n-propyl, isopropyl or cyclopropyl, each $R^3$, $R^5$, and $R^6$ are hydrogen, and $R^4$ and $R^7$ are, independently, a $C_1$ to $C_4$ alkyl group, preferably methyl, ethyl, propyl, butyl, or an isomer thereof.

In a preferred embodiment of the invention, each $R^2$, $R^4$, and $R^7$ are independently methyl, ethyl, or n-propyl, each $R^5$ and $R^6$ are independently, a $C_1$ to $C_{10}$ alkyl group, preferably methyl, ethyl, propyl, butyl, pentyl, heptyl, hexyl, octyl, nonyl, decyl or an isomer thereof, $R^3$ is hydrogen, and $R^5$ and $R^6$ are joined together to form a 5-membered partially unsaturated ring.

In a preferred embodiment of the invention, each $R^2$, $R^4$ and $R^7$ are the same and are selected from the group consisting of $C_1$ to $C_3$ alkyl group, preferably methyl, ethyl, propyl, and isomers thereof, and $R^3$, $R^5$ and $R^6$ are hydrogen.

In a preferred embodiment of the invention, J is preferably represented by the formula:

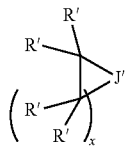

wherein J' is a carbon or silicon atom, x is 1, 2, 3, or 4, preferably 2 or 3, and each R' is, independently, hydrogen or $C_1$-$C_{10}$ hydrocarbyl, preferably hydrogen. Particularly preferred J groups include cyclopentamethylenesilylene, cyclotetramethylenesilylene, cyclotrimethylenesilylene, and the like.

In a preferred embodiment of the invention, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl, ethyl, propyl, butyl or pentyl group, preferably a methyl group.

In a preferred embodiment of the invention, $R^4$ is not an aryl group (substituted or unsubstituted). An aryl group is defined to be a single or multiple fused ring group where at least on ring is aromatic. A substituted aryl group is an aryl group where a hydrogen has been replaced by a heteroatom or heteroatom containing group. Examples of aryl groups include phenyl, benzyl, carbazolyl, naphthyl, and the like.

In a preferred embodiment this invention, $R^2$, $R^4$ and $R^7$ are not a substituted or unsubstituted aryl group.

In a preferred embodiment this invention, $R^2$, $R^4$, $R^5$, $R^6$ and $R^7$ are not a substituted or unsubstituted aryl group.

Metallocene compounds that are particularly useful in this invention include one or more of:
cyclotetramethylenesilylene-bis(2,4,7-trimethylinden-1-yl) hafnium dimethyl,
cyclopentamethylenesilylene-bis(2,4,7-trimethylinden-1-yl) hafnium dimethyl,
cyclotrimethylenesilylene-bis(2,4,7-trimethylinden-1-yl) hafnium dimethyl,
cyclotetramethylenesilylene-bis(2,4-dimethylinden-1-yl) hafnium dimethyl,
cyclopentamethylenesilylene-bis(2,4-dimethylinden-1-yl) hafnium dimethyl,
cyclotrimethylenesilylene-bis(2,4-dimethylinden-1-yl)hafnium dimethyl,
cyclotetramethylenesilylene-bis(4,7-dimethylinden-1-yl) hafnium dimethyl,
cyclopentamethylenesilylene-bis(4,7-dimethylinden-1-yl) hafnium dimethyl,
cyclotrimethylenesilylene-bis(4,7-dimethylinden-1-yl)hafnium dimethyl,
cyclotetramethylenesilylene-bis(2-methyl-4-cyclopropylinden-1-yl)hafnium dimethyl,
cyclopentamethylenesilylene-bis(2-methyl-4-cyclopropylinden-1-yl)hafnium dimethyl,
cyclotrimethylenesilylene-bis(2-methyl-4-cyclopropylinden-1-yl)hafnium dimethyl,
cyclotetramethylenesilylene-bis(2-ethyl-4-cyclopropylinden-1-yl)hafnium dimethyl,
cyclopentamethylenesilylene-bis(2-ethyl-4-cyclopropylinden-1-yl)hafnium dimethyl,
cyclotrimethylenesilylene-bis(2-ethyl-4-cyclopropylinden-1-yl)hafnium dimethyl,
cyclotetramethylenesilylene-bis(2-methyl-4-t-butylinden-1-yl)hafnium dimethyl,
cyclopentamethylenesilylene-bis(2-methyl-4-t-butylinden-1-yl)hafnium dimethyl,
cyclotrimethylenesilylene-bis(2-methyl-4-t-butylinden-1-yl)hafnium dimethyl,
cyclotetramethylenesilylene-bis(4,7-diethylinden-1-yl)hafnium dimethyl,
cyclopentamethylenesilylene-bis(4,7-diethylinden-1-yl)hafnium dimethyl,
cyclotrimethylenesilylene-bis(4,7-diethylinden-1-yl)hafnium dimethyl,
cyclotetramethylenesilylene-bis(2,4-diethylinden-1-yl)hafnium dimethyl,
cyclopentamethylenesilylene-bis(2,4-diethylinden-1-yl)hafnium dimethyl,
cyclotrimethylenesilylene-bis(2,4-diethylinden-1-yl)hafnium dimethyl,
cyclotetramethylenesilylene-bis(2-methyl-4,7-diethylinden-1-yl)hafnium dimethyl,
cyclopentamethylenesilylene-bis(2-methyl-4,7-diethylinden-1-yl)hafnium dimethyl,
cyclotrimethylenesilylene-bis(2-methyl-4,7-diethylinden-1-yl)hafnium dimethyl,
cyclotetramethylenesilylene-bis(2-ethyl-4-methylinden-1-yl)hafnium dimethyl,
cyclopentamethylenesilylene-bis(2-ethyl-4-methylinden-1-yl)hafnium dimethyl,
cyclotrimethylenesilylene-bis(2-ethyl-4-methylinden-1-yl) hafnium dimethyl,
cyclotetramethylenesilylene-bis(2-methyl-4-isopropylinden-1-yl)hafnium dimethyl,
cyclopentamethylenesilylene-bis(2-methyl-4-isopropylinden-1-yl)hafnium dimethyl,
cyclotrimethylenesilylene-bis(2-methyl-4-isopropylinden-1-yl)hafnium dimethyl,
cyclotetramethylenesilylene-bis(4,6,8-trimethyl-1,2,3-trihydro-s-indacen-5-yl)hafnium dimethyl,
cyclopentamethylenesilylene-bis(4,6,8-trimethyl-1,2,3-trihydro-s-indacen-5-yl)hafnium dimethyl, and
cyclotrimethylenesilylene-bis(4,6,8-trimethyl-1,2,3-trihydro-s-indacen-5-yl)hafnium dimethyl.

In a preferred embodiment of the invention, the catalyst compound is in the rac form. In a preferred embodiment of the invention, at least 90 wt % of the catalyst compound is in the rac form, based upon the weight of the rac and meso forms present, preferably from 92 to 100 wt %, preferably from 95 to 100 wt %, preferably from 98 to 100 wt %. In a preferred embodiment of the invention, the catalyst compound is greater than 90% rac, preferably greater than 95% rac, preferably greater than 98% rac.

In a preferred embodiment, the hafnium bis-indenyl metallocene compound used herein is at least 90% rac isomer and is the indenyl groups are substituted at the 4 position with a $C_1$ to $C_{10}$ alkyl group, the 3 position is hydrogen, the bridge is carbon or silicon which is incorporated into a 4, 5 or 6 membered ring.

The metallocene compounds described herein are synthesized according to procedures describe in U.S. Ser. No. 61/847,442, filed Jul. 17, 2013.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl)ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277, 003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (1):

$$(Z)_d^+(A^{d-}) \qquad (1)$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. In a preferred embodiment, the reducible Lewis acid is triphenyl carbenium.

The anion component A$^{d-}$ include those having the formula [M$^{k+}$Q$_n$]$^{d-}$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoro aryl group. Examples of suitable A$^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with metallocene catalyst compound described herein, a chain transfer agent and a boron containing NCA activator represented by the formula (2):

$$Z_d^+(A^{d-}) \qquad (2)$$

where: Z is (L-H) or a reducible Lewis acid; L is an neutral Lewis base (as further described above); H is hydrogen; (L-H) is a Bronsted acid (as further described above); A$^{d-}$ is a boron containing non-coordinating anion having the charge d− (as further described above); d is 1, 2, or 3.

In a preferred embodiment in any NCA's represented by Formula 2 described above, the reducible Lewis acid is represented by the formula: (Ar$_3$C$^+$), where Ar is aryl or aryl substituted with a heteroatom, a C$_1$ to C$_{40}$ hydrocarbyl, or a substituted C1 to C40 hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl.

In a preferred embodiment in any of the NCA's represented by Formula 2 described above, Z$_d^+$ is represented by the formula: (L-H)$_d^+$, wherein L is an neutral Lewis base; H is hydrogen; (L-H) is a Bronsted acid; and d is 1, 2, or 3, preferably (L-H)$_d^+$ is a Bronsted acid selected from ammoniums, oxoniums, phosphoniums, silyliums, and mixtures thereof.

In a preferred embodiment in any of the NCA's represented by Formula 2 described above, the anion component A$^{d-}$ is represented by the formula [M*$^{k*+}$Q*$_{n*}$]$^{d*-}$ wherein k* is 1, 2, or 3; n* is 1, 2, 3, 4, 5, or 6 (preferably 1, 2, 3, or 4); n*−k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene) with an metallocene catalyst compound described herein, a chain transfer agent and an NCA activator represented by the formula (3):

$$R_nM^{**}(ArNHal)_{4-n} \qquad (3)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 3 also comprises a suitable cation that is essentially non-interfering with the ionic catalyst complexes formed with the transition metal compounds, preferably the cation is Z$_d^+$ as described above.

In a preferred embodiment in any of the NCA's comprising an anion represented by Formula 3 described above, R is selected from the group consisting of substituted or unsubstituted C$_1$ to C$_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl groups; —SR$^1$, —NR$^2_2$, and —PR$^3_2$, where each R$^1$, R$^2$, or R$^3$ is independently a substituted or unsubstituted hydrocarbyl as defined above; or a C$_1$ to C$_{30}$ hydrocarbyl substituted organometalloid.

In a preferred embodiment in any of the NCA's comprising an anion represented by Formula 3 described above, the NCA also comprises cation comprising a reducible Lewis acid represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl.

In a preferred embodiment in any of the NCA's comprising an anion represented by Formula 3 described above, the NCA also comprises a cation represented by the formula, $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (4):

$$(OX^{e+})_d(A^{d-})_e \quad (4)$$

wherein $OX^{e+}$ is a cationic oxidizing agent having a charge of e+; e is 1, 2, or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, metallocene catalyst compounds described herein can be used with Bulky activators. A "Bulky activator" as used herein refers to anionic activators represented by the formula:

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);

L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | MV Per subst. (Å³) | Total MV (Å³) |
| --- | --- | --- | --- | --- |
| Dimethylanilinium tetrakis(perfluoronaphthyl)borate | 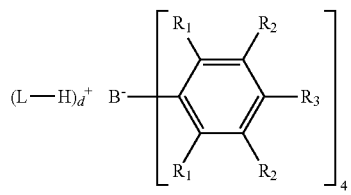 | $C_{10}F_7$ | 261 | 1044 |

| Activator | Structure of boron substituents | Molecular Formula of each substituent | MV Per subst. (Å³) | Total MV (Å³) |
|---|---|---|---|---|
| Dimethylanilinium tetrakis(perfluorobiphenyl)borate | | $C_{12}F_9$ | 349 | 1396 |
| [4-tButyl-PhNMe$_2$H] [(C$_6$F$_3$(C$_6$F$_5$)$_2$)$_4$B] | | $C_{18}F_{13}$ | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Illustrative, but not limiting, examples of boron compounds which may be used as an activator in the processes of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis (perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$-], [Me$_3$NH$^+$][B(C$_6$F$_5$)$_4$-]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a particularly preferred embodiment, the activator used in combination with any catalyst compound(s) described herein is N,N-dimethylanilinium tetrakis(perfluoronaphthyl)borate.

In a preferred embodiment, any of the activators described herein may be mixed together before or after combination with the catalyst compound, preferably before being mixed with the catalyst compound.

In some embodiments two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator).

Optional Scavengers or Co-Activators

In addition to the activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. Most preferably the surface area of the support material is in the range is from about 100 to about 400 $m^2/g$, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the metallocene, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as propylene and or ethylene), and optionally comonomer, are contacted with a catalyst system comprising an activator and at least one metallocene compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Preferably the comonomer(s) are present in the copolymer at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (such as propylene).

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 20 MPa, preferably from about 0.45 MPa to about 16 MPa, or preferably from about 0.5 MPa to about 12 MPa.

In a typical polymerization, the run time of the reaction is up to 300 minutes, preferably in the range of from about 5 to 250 minutes, or preferably from about 10 to 120 minutes.

In a some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the activity of the catalyst is at least 50 g/mmol/hour, preferably 500 or more g/mmol/hour, preferably 5000 or more g/mmol/hr, preferably 50,000 or more g/mmol/hr, preferably 100,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In an embodiment of the invention, little or no alumoxane is used in the process to produce the polymers. Preferably, alumoxane is present at zero mol %, alternately the alumoxane is present at a molar ratio of aluminum to transition metal 500:1 or less, preferably 300:1 or less, preferably 100:1 or less.

In an embodiment of the invention, little or no scavenger is used in the process to produce the polymer. The scavenger may be present at a molar ratio of scavenger metal to transition metal of less than 100:1, preferably less than 50:1, preferably less than 20:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 20 MPa (preferably 0.35 to 16 MPa, preferably from 0.45 to 12 MPa, preferably from 0.5 to 10 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents) or aromatic solvents such as toluene, benzene or xylenes; 4) wherein the catalyst system used in the polymerization comprises less than 0.5 mol %, preferably 0 mol % alumoxane, alternately the alumoxane is present at a molar ratio of aluminum to transition metal 500:1 or less, preferably 300:1 or less, preferably 100:1 or less), the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 20:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

In a preferred embodiment of the invention, higher reactor temperatures, such as 70 to 150° C. and Bulky activators, such N,N-dimethylanilinium tetrakis(perfluoronaphthyl)borate are used.

Polyolefin Products

This invention also relates to compositions of matter produced by the methods described herein.

Generally, the process of this invention produces olefin polymers, preferably polypropylene homopolymers and ethylene-propylene copolymers.

In an embodiment, this invention relates to a branched propylene-ethylene copolymer having 1) 20 wt. % ethylene or less (alternatively 15 wt. % ethylene or less, alternatively 10 wt. % ethylene or less), 2) a Tm of 50° C. or more (alternatively 70° C. or more, alternatively 80° C. or more, alternatively 90° C. or more, alternatively 100° C. or more, alternatively 110° C. or more); and 3) greater than 75% vinyl chain ends (relative to the total unsaturated chain ends) (alternatively greater than 80% vinyl chain ends, alternatively greater than 85% vinyl chain ends).

In a preferred embodiment, the monomer is propylene and the comonomer is ethylene, preferably from 0.5 to 50 mole % ethylene, alternately 1 to 40 mole %, alternately 1 to 30% mole, alternately 1 to 25 mole %, alternately 1 to 20 mole %, alternately 1 to 15 mole %, alternately 1 to 10 mole %.

In a preferred embodiment, the monomer is propylene and the comonomer is ethylene, preferably from 0.5 to 50 wt. % ethylene, alternately 1 to 40 wt. %, alternately 1 to 30 wt. %, alternately 1 to 25 wt. %, alternately 1 to 20 wt. %, alternately 1 to 15 wt. %, alternately 1 to 10 wt %.

In a preferred embodiment, the monomer is propylene and the comonomer is ethylene, preferably from 0.5 to 50 mole % ethylene, alternately 1 to 40 mole %, alternately 1 to mole 30%, alternately 1 to mole 20%, alternately 1 to 10 mole %; and the propylene-ethylene copolymer contains greater than 50% vinyl unsaturation, alternately greater than 60% vinyl unsaturation, alternately greater than 70% vinyl unsaturation, alternately greater than 80% vinyl unsaturation, alternately greater than 90% vinyl unsaturation, alternately greater than 95% vinyl unsaturation. Percent vinyl unsaturation is relative to total unsaturated chain ends.

In a preferred embodiment, the monomer is propylene and no comonomer is present.

In a preferred embodiment, the monomer is propylene, no comonomer is present, and the polymer is isotactic.

In a preferred embodiment, the propylene homopolymer contains greater than 50% vinyl unsaturation, alternately greater than 60% vinyl unsaturation, alternately greater than 70% vinyl unsaturation, alternately greater than 80% vinyl unsaturation, alternately greater than 90% vinyl unsaturation, alternately greater than 95% vinyl unsaturation. Percent vinyl unsaturation is relative to total unsaturated chain ends.

Typically, the polymers produced herein have an Mw of 3,000 to 300,000 g/mol (preferably 5,000 to 200,000 g/mol, preferably 10,000 to 150,000 g/mol, preferably 10,000 to 100,000 g/mol, and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment the polymer produced herein has a unimodal or multimodal molecular weight distribution (MWD=Mw/Mn) as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In a preferred embodiment the copolymers produced herein have a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 10,000 g/mol are ignored when determining CDBI.

In a preferred embodiment of the invention, the polymer produced herein is isotactic, preferably highly isotactic. An "isotactic" polymer has at least 10% isotactic pentads, a "highly isotactic" polymer has at least 50% isotactic pentads, and a "syndiotactic" polymer has at least 10% syndiotactic pentads, according to analysis by $^{13}$C-NMR. Preferably isotactic polymers have at least 25% (preferably at least 50%, preferably at least 70%, preferably at least 80%, preferably at least 90%) isotactic pentads. A polyolefin is "atactic" if it has less than 5% isotactic pentads and less than 5% syndiotactic pentads.

In an embodiment of the invention, the polymer produced herein has an mm triad tacticity index of 75% or greater (preferably 80% or greater, preferably 85% or greater, preferably 90% or greater, preferably 95% or greater, as determined by Carbon 13 NMR as described below.

In a preferred embodiment of the invention, the polymer produced herein is isotactic, and contains 2,1- or 1,3-regiodefects (1,3-regiodefects are also sometimes called 3,1-regiodefects, and the term regiodefect is also called regioerror). In some embodiments of the invention, regiodefects are desired and advantageous, and in particular 1,3-regiodefects are desired. Isotactic polymers with high levels of regiodefects have properties similar to propylene-ethylene copolymers containing low levels of ethylene. In some embodiments of the invention, the polymer produced herein has 20 to 300 total regiodefects/10,000 propylene units (defined as the sum of 2,1-erythro and 2,1-threo insertions, and 3,1-isomerizations (also called 1,3-insertions) as measured by $^{13}$C-NMR) (preferably 30 to 200 total regiodefects/10,000 propylene units, preferably, 50 to 150 total regiodefects/10,000 propylene units).

In a preferred embodiment, the isotactic polypropylene polymer has 1,3-regiodefects of at least 60/10,000 C or greater as determined by $^{13}$C NMR.

In a preferred embodiment, the isotactic polypropylene polymer has 2,1-regiodefects of 10/10,000 C or less as determined by $^{13}$C NMR.

In a preferred embodiment, the isotactic polypropylene polymer has 1,3-regiodefects of at least 30/10,000 C or greater and stereodefects of at least 100/10,000 C or greater as determined by $^{13}$C NMR.

In a preferred embodiment of the invention, the polymer produced herein is an ethylene-propylene copolymer, and the copolymer is blocky. A blocky copolymer is one in which the product of the reactivity ratios ($r_1 r_2$) is greater than 1. A copolymerization between monomers "E" and "P" in the presence of catalyst "M" can be represented by the following reaction schemes and rate equations where $R_{11}$ is the rate of "E" insertion after "E", $R_{12}$ is the rate of "P" insertion after "E", $R_{21}$ is the rate of "E" insertion after "P", $R_{22}$ is the rate of "P" insertion after "P", and $k_{11}$, $k_{12}$, $k_{21}$, and $k_{22}$ are the corresponding rate constants for each. The reactions scheme and rate equations are illustrated below.

M-E+E→M-E-E $R_{11}=k_{11}[M-E][E]$
M-E+P→M-P-E $R_{12}=k_{12}[M-E][P]$
M-P+E→M-E-P $R_{21}=k_{21}[M-P][E]$
M-P+P→M-P-P $R_{22}=k_{22}[M-P][P]$

The reactivity ratios $r_1$ and $r_2$ are:

$$r_1 = \frac{k_{11}}{k_{12}}$$

$$r_2 = \frac{k_{22}}{k_{21}}$$

$$r_1 r_2 = \frac{k_{11}k_{22}}{k_{12}k_{21}}$$

The product of $r_1 \times r_2$ provides information on how the different monomers distribute themselves along the polymer chain. Below, are illustrations of alternating, random and blocky copolymers and how the product of $r_1 \times r_2$ relates to each $r_1 r_2=0$ alternating copolymerization EPEPEPEPEPEPEPEPEP $r_1 r_2=1$ random copolymerization PPEPEPEPPEPPPEEPEEPE $r_1 r_2>1$ blocky copolymerization PPPPEEEEEEPPPEEEEEPP $^{13}$C-NMR Spectroscopy on Polyolefins Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C-NMR METHOD (Academic Press, New York, 1977).

The "propylene tacticity index", expressed herein as [m/r], is calculated as defined in H. N. Cheng, *Macromolecules*, 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

The "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

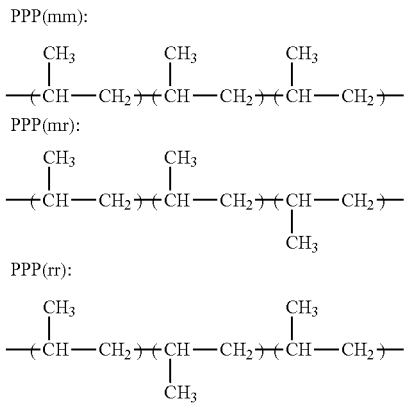

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, CATALYTIC POLYMERIZATION OF OLEFINS: PROCEEDINGS OF THE INTERNATIONAL SYMPOSIUM ON FUTURE ASPECTS OF OLEFIN POLYMERIZATION, T. Keii and K. Soga, Eds. (Elsevier, 1986), pp. 271-292; and 2) U.S. Patent Application Publication No. US2004/054086 (paragraphs [0043] to [0054]).

Similarly m diads and r diads can be calculated as follows where mm, mr and mr are defined above:

$m=mm+\frac{1}{2}mr$ $r=rr+\frac{1}{2}mr$ $^{13}$C NMR was used to determine monomer content and sequence distribution for the ethylene-propylene copolymers using the procedure from J. C. Randall's paper: Polymer Reviews, 1989, 29:2, 201-317. The calculations of mole % C$_3$, run number, average sequence length, and diad/triad distributions were all calculated per the method established in the above paper. Calculations for $r_1r_2$ were based on the equation $r_1r_2=4*[EE]*[PP]/[EP]^2$; where [EE], [EP], [PP] are the diad molar concentrations; E is ethylene, P is propylene. For other copolymers of ethylene, a similar methodoly is used.

In another embodiment of the invention, the propylene polymers produced herein (preferably a homopolypropylene) have regiodefects (as determined by $^{13}C$ NMR), based upon the total propylene monomer. Three types defects are defined to be the regio defects: 2,1-erythro, 2,1-threo, and 3,1-isomerization. The structures and peak assignments for these are given in [L. Resconi, L. Cavallo, A. Fait, and F. Piemontesi, Chem. Rev. 2000, 100, pp. 1253-1345]. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, CH, $CH_2$), and multiplied by 10000 to determine the defect concentration per 10000 monomers.

The polymers produced herein typically have at least 50% allyl chain ends and/or 3-alkyl chain ends (preferably at least 60%, at least 70%, at least 80%, at least 90%, at least 95%, at least 98%, or at least 99% allyl chain ends and/or 3-alkyl chain ends).

An allyl chain end is represented by $CH_2CH$—$CH_2$—, as shown in the formula:

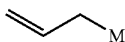

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer, and in selected cases, confirmed by $^{13}C$ NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination", is represented by the formula:

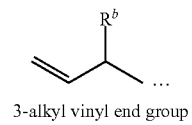

3-alkyl vinyl end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}C$ NMR as set out below.

Mn ($^1H$ NMR) is determined according to the following NMR method. $^1H$ NMR data is collected at either room temperature or 120° C. (for purposes of the claims, 120° C. shall be used) in a 5 mm probe using a Varian spectrometer with a $^1H$ frequency of 250 MHz, 400 MHz, or 500 MHz (for the purpose of the claims, a proton frequency of 500 MHz is used and the polymer sample is dissolved in 1,1,2,2-tetrachloroethane-$d_2$ (TCE-$d_2$) and transferred into a 5 mm glass NMR tube). Data are recorded using a maximum pulse width of 45° C., 5 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
| --- | --- | --- |
| Vinyl | 4.98-5.13 | 2 |
| Vinylidene (VYD) | 4.69-4.88 | 2 |
| Vinylene | 5.31-5.55 | 2 |
| Trisubstituted | 5.11-5.30 | 1 |

In a preferred embodiment of the invention, the polymer produced herein is an a propylene homopolymer, or a copolymer of ethylene and propylene, where in the copolymers comprises from 0.1 to 50 wt % ethylene) and having: 1) at least 50% allyl chain ends; 2) an Mw of 3000 g/mol or more, 3) a Tm of 90° C. or more, and 4) a $g'_{vis}$ of 0.90 or less.

In a preferred embodiment of the invention, the polymer produced herein is a has a branching index ($g'_{vis}$) of 0.90 or less, preferably 0.87 or less, preferably 0.85 or less, preferably 0.80 or less, preferably 0.75 or less, preferably 0.70 or less, as determined by GPC, as described in the Examples section below.

In a preferred embodiment of the invention, the polymer produced herein (preferably an ethylene-propylene copolymer (preferably having 70 wt % or more propylene) or a isotactic propylene polymer) has: 1) a branching index ($g'_{vis}$) of 0.90 or less (preferably 0.87 or less, preferably 0.85 or less, preferably 0.80 or less, preferably 0.75 or less, preferably 0.70 or less, as determined by GPC), 2) at least 50% allyl chain ends or 3-alkyl chain ends (preferably at least 60%, at least 70%, at least 80%, at least 90%, at least 95%, at least 98%, or at least 99% allyl chain ends or 3-alkyl chain ends), 3) an Mw from 3,000 to 300,000 g/mol, alternately from 5,000 to 200,000 g/mol, alternately 10,000 to 150,000 g/mol, alternately 20,000 to 100,000 g/mol; and 4) a Tm of 90° C. or more, alternately 100° C. or more, alternately 110° C. or more, alternately 115° C. or more, alternately 120° C.

or more, alternately 125° C. or more, preferably the polymer has at least X % vinyl chain ends (relative to total unsaturations as measured by $^1$H NMR, where X=47.8*g'$_{vis}$+45.1 (alternately X=47.8*g'$_{vis}$+46.1, alternately X=47.8*g'$_{vis}$+47.1).

The polymers prepared herein may be functionalized by reacting a heteroatom containing group with the polymer with or without a catalyst. Examples include catalytic hydrosilylation, ozonolysis, hydroformylation, or hydroamination, sulfonation, halogenation, hydrohalogenation, hydroboration, epoxidation, or Diels-Alder reactions with polar dienes, Friedel-Crafts reactions with polar aromatics, maleation with activators such as free radical generators (e.g. peroxides). The functionalized polymers can be used in oil additives, as anti-fogging or wetting additives, adhesion promoters and many other applications. Preferred uses include additives for lubricants and or fuels. Preferred heteroatom containing groups include, amines, aldehydes, alcohols, acids, anhydrides, sulphonates, particularly succinic acid, maleic acid and maleic anhydride.

Other uses of the functionalized polymers include as plasticizers, surfactants for soaps, detergents, fabric softeners, antistatics, etc. Preferred heteroatom containing groups include, amines, aldehydes, alcohols, acids, anhydrides, and sulphonates, particularly succinic acid, maleic acid and maleic anhydride.

In some embodiments the polymers produced herein are functionalized as described in U.S. Pat. No. 6,022,929; A. Toyota, T. Tsutsui, and N. Kashiwa, Polymer Bulletin 48, 213-219, 2002; and J. Am. Chem. Soc., 1990, 112, 7433-7434.

Blends

In another embodiment, the polymer (preferably the polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Any of the foregoing polymers, including blends thereof, may be used in a variety of end-use applications. Such applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Molded Products

The polymers described herein (preferably propylene polymers) and blends thereof may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the polymers described herein (preferably propylene polymers) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING, pp. 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or alternatively by calendaring. Sheets are generally considered to have a thickness of from 10 mils to 100 mils (254 μm to 2540 μm), although any given sheet may be substantially thicker.

Non-Wovens and Fibers

The polymers produced herein may also be used to prepare nonwoven fabrics and fibers in any nonwoven fabric and fiber making process, including but not limited to, melt blowing, spunbonding, film aperturing, and staple fiber carding. A continuous filament process may also be used. Preferably a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

1. This invention also relates to a process for polymerization, comprising: (i) contacting one or more monomers comprising propylene and optionally ethylene, with a catalyst system comprising a metallocene catalyst compound and an activator, wherein the metallocene catalyst compound is represented by the formula:

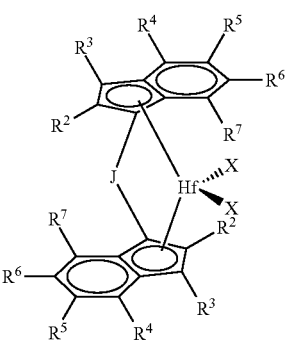

where each $R^3$ is hydrogen; each $R^4$ is independently a $C_1$-$C_{10}$ alkyl; each $R^2$ and $R^7$ is independently hydrogen, or $C_1$-$C_{10}$ alkyl, each $R^5$ and $R^6$ is independently hydrogen, $C_1$-$C_{50}$ substituted or unsubstituted hydrocarbyl, or $C_1$-$C_{50}$ substituted or unsubstituted halocarbyl; and $R^4$ and $R^5$, $R^5$ and $R^6$ and/or $R^6$ and $R^7$ may optionally be bonded together to form a ring structure; J is a bridging group represented by the formula $R^a{}_2J'$, where J' is C or Si, and each $R^a$ is, independently, $C_1$ to $C_{20}$ substituted or unsubstituted hydrocarbyl, and the two $R^a$ form a cyclic structure incorporating J' and the cyclic structure may be a saturated or partially saturated cyclic or fused ring system; and each X is a univalent anionic ligand, or two Xs are joined and bound to the metal atom to form a metallocycle ring, or two Xs are joined to form a chelating ligand, a diene ligand, or an alkylidene ligand; and (ii) obtaining a polymer having: 1) greater than 40% vinyl chain ends, relative to the total unsaturated chain ends, 2) a Tm of 70° C. or more; 3) an Mw of 3000 to 300,000 g/mol, and 4) a $g'_{vis}$ of 0.90 or less.

2. The process of paragraph 1, wherein step (i) occurs at a temperature of greater than 60° C. (alternatively 70° C., alternatively 80° C., alternatively 90° C., alternatively 100° C.)

3. The process of paragraph 1, wherein the polymer produced has 1) greater than 70% vinyl chain ends, relative to total unsaturated chain ends (alternatively 75%, alternatively 80%, alternatively 85%, alternatively 90%), and 2) a Mw of 3000 to 200,000 g/mole (alternatively 5,000 to 150,000, alternatively 10,000 to 100,000)

4. The process of paragraph 1, 2 or 3, wherein the polymer produced is isotactic polypropylene having a Tm of 115° C. or more (alternatively 120° C. or more, alternatively 125° C. or more).

5. The process of paragraph 1, wherein the polymer produced is a propylene-ethylene copolymer containing 30 wt % or less of ethylene (alternatively 25 wt % or less of ethylene, alternatively 20 wt % or less of ethylene, alternatively 15 wt % or less of ethylene, alternatively 10 wt % or less of ethylene).

6. The process of paragraph 1, 2, 3 or 4 wherein the polyolefin produced has a $g'_{vis}$ of 0.85 or less.

7. The process of paragraph 4, wherein the polyolefin produced has at least X % vinyl chain ends (relative to total unsaturations as measured by $^1$H NMR, where $X=47.8*g'_{vis}+45.1$.

8. A branched polymer produced by any of the above paragraphs 1 to 7.

9. A branched isotactic polypropylene polymer having at least X % vinyl chain ends (relative to total unsaturations as measured by $^1$H NMR), where $X=47.8*g'_{vis}+45.1$.

10. The polymer of paragraph 8 or 9 having greater than 80% vinyl unsaturation (relative to total unsaturation as measured by $^1$H NMR) (alternatively greater the 85%).

11. The polymer of paragraph 8, 9 or 10 having a Mw of 3000 to 100,000 g/mol (alternatively 4000 to 50,000 g/mol).

12. The polymer of paragraph 8, 9, 10 or 11 having a Tm of 100° C. more (alternatively 110° C. more, alternatively 115° C. more, alternatively 100° C. more, alternatively 130° C. more).

13. A branched propylene-ethylene copolymer having 1) 20 wt. % ethylene or less (alternatively 15 wt. % ethylene or less, alternatively 10 wt. % ethylene or less), 2) a Tm of 50° C. or more (alternatively 70° C. or more, alternatively 80° C. or more, alternatively 90° C. or more, alternatively 100° C. or more, alternatively 110° C. or more); and 3) greater than 75% vinyl chain ends (relative to the total unsaturated chain ends) (alternatively greater than 80% vinyl chain ends, alternatively greater than 85% vinyl chain ends).

14. The polymer of paragraph 13 having a Mw of 20,000 to 300,000 g/mol (alternatively 25,000 to 250,000).

15. The process of any of paragraphs 1 to 8 wherein $R^2$, $R^4$ and $R^7$ are, independently, selected from the group consisting of methyl, ethyl, propyl, butyl, pentyl, heptyl, hexyl, octyl, nonyl, decyl and an isomers thereof 16. The process of any of paragraphs 1 to 8, and 15 wherein $R^2$ and $R^4$ are, independently, a $C_1$ to $C_{10}$ alkyl.

17. The process of any of paragraphs 1 to 8, 15 and 16 wherein $R^4$ and $R^7$ are, independently, a $C_1$ to $C_{10}$ alkyl.

18. The process of any of paragraphs 1 to 8, 15, 16 and 17 wherein each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system).

19. The process of any of paragraphs 1 to 8, and 15-18 wherein J is represented by the formula:

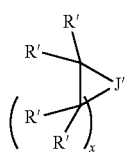

wherein J' is a carbon or silicon atom, x is 1, 2, 3, or 4, and each R' is, independently, hydrogen or $C_1$-$C_{10}$ hydrocarbyl.

20. The process of any of paragraphs 1 to 8, and 15 to 19 wherein J is cyclopentamethylenesilylene, cyclotetramethylenesilylene, cyclotrimethylenesilylene.

21. The process of any of paragraphs 1 to 8, and 15 to 20 wherein the activator comprises alumoxane, preferably present at a molar ratio of aluminum to catalyst compound transition metal of 100:1 or more.

22. The process of any of paragraphs 1 to 8, and 15 to 21 wherein the activator comprises a non-coordinating anion activator.

23. The process of any of paragraphs 1 to 8, and 15 to 22 wherein activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

24. The process of any of paragraphs 1 to 8, and 15 to 22 wherein activator is represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

EXPERIMENTAL

Gel Permeation Chromatography

Mw, Mn, Mz, number of carbon atoms and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI, and (dn/dc) is the refractive index increment for the system. The refractive index, n=1.500 for TCB at 145° C. and =690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{k_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, $P(\theta)$ is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 145° C. and $\lambda$=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i [\eta]_i}$$

where the summations are over the chromatographic slices, i, between the integration limits. The branching index $g'_{vis}$ is defined as:

$$g'vis = \frac{[\eta]_{avg}}{k M_v^\alpha}$$

where, for purpose of this invention and claims thereto, $\alpha$=0.695 and k=0.000579 for linear ethylene polymers, $\alpha$=0.705 k=0.000262 for linear propylene polymers, and $\alpha$=0.695 and k=0.000181 for linear butene polymers. $M_v$ is the viscosity-average molecular weight based on molecular weights determined by LS analysis.

Viscosity was measured using a Brookfield Viscometer according to ASTM D-3236.

Peak melting point, Tm, (also referred to as melting point), peak crystallization temperature, Tc, (also referred to as crystallization temperature), glass transition temperature (Tg), heat of fusion ($\Delta H_f$), and percent crystallinity were determined using the following DSC procedure according to ASTM D3418-03. Differential scanning calorimetric (DSC) data were obtained using a TA Instruments model Q200 machine or similar machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted. This DSC technique described was used for polymers produced from continuous stirred tank reactor runs.

MFR (dg/min) is determined according to ASTM 1238 using a load of 2.16 kg and at a temperature of 230 C.

List of Catalysts

Compounds used in the following polymerization examples include:

rac-cyclotetramethylenesilylene-bis(2,4,7-trimethylinden-1-yl)hafnium dimethyl (2)

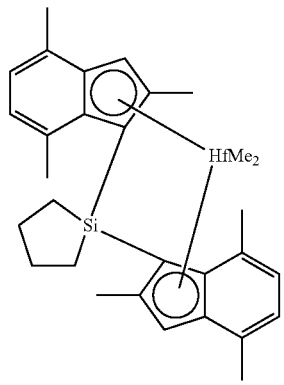

rac-cyclotetramethylenesilylene-bis(2,4-dimethylinden-1-yl)hafnium dichloride (7)

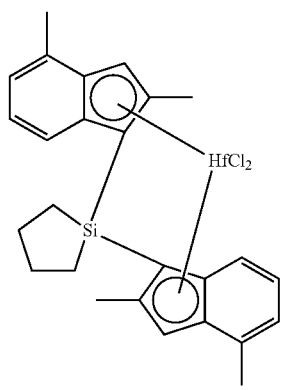

rac-cyclotetramethylenesilylene-bis(4-isopropyl-2-methylinden-1-yl)hafnium dichloride (8)

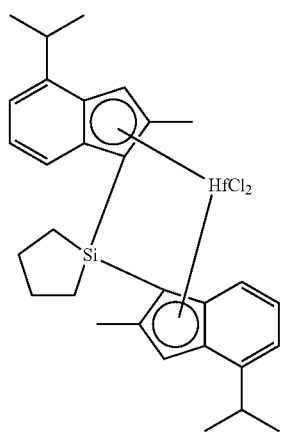

rac-cyclotrimethylenesilylene-bis(2,4-dimethylinden-1-yl)hafnium dichloride (9)

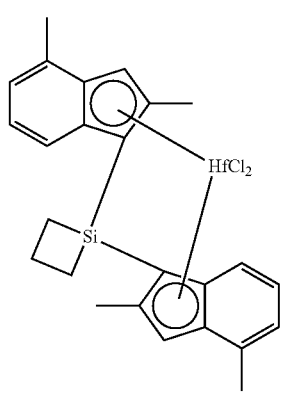

rac-cyclotrimethylenesilylene-bis(4-tert-butyl-2-methylinden-1-yl)hafnium dichloride (10)

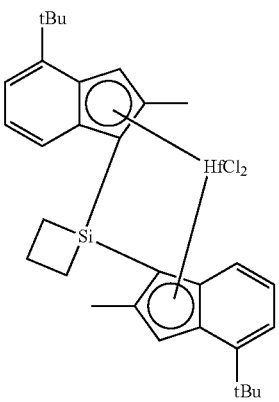

rac-cyclopentamethylenesilylene-bis[4,7-dimethylinden-1-yl]hafnium dichloride (11)

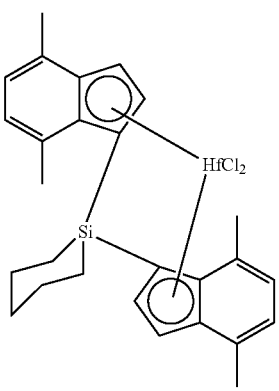

rac-cyclopentamethylenesilylene-bis[4,7-dimethylinden-1-yl]hafnium dimethyl (12)

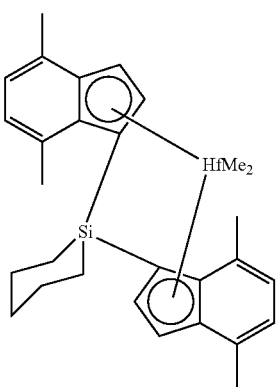

rac-cyclotetramethylenesilylene-bis[4,7-dimethylinden-1-yl]hafnium dichloride (13)

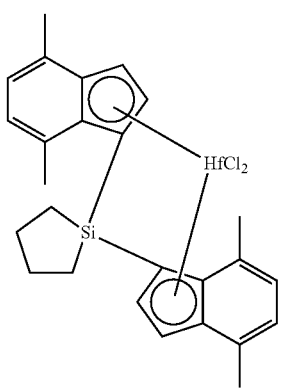

rac-cyclotetramethylenesilylene-bis[4,7-dimethylinden-1-yl]hafnium dimethyl (14)

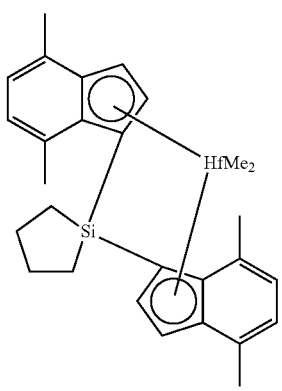

rac-cyclotetramethylenesilylene-bis[4,6,8-trimethyl-1,2,3-trihydro-s-indacen-5-yl]hafnium dichloride (15)

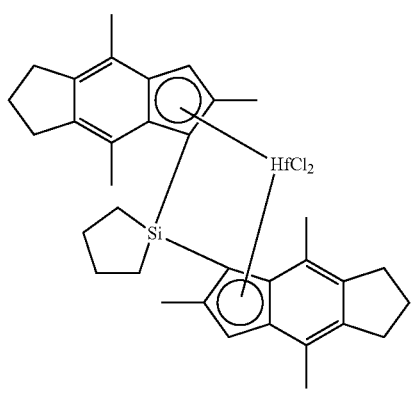

rac-cyclotetramethylenesilylene-bis[4,6,8-trimethyl-1,2,3-trihydro-s-indacen-5-yl]hafnium dimethyl (16)

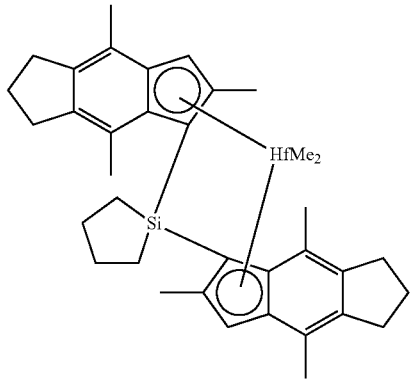

rac-cyclotrimethylenesilylene-bis[2,4,7-trimethylinden-1-yl]hafnium dichloride (17)

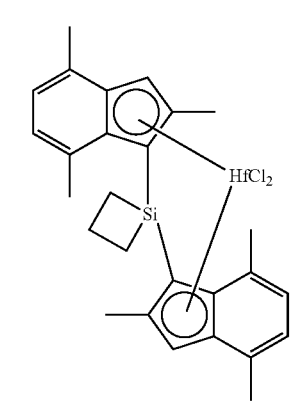

rac-cyclotetramethylsilylene-bis[4-cyclopropyl-2-methylinden-1-yl]hafnium dichloride (18)

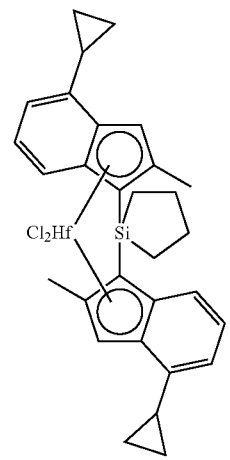

The above compounds were prepared according to the general procedures described in U.S. Ser. No. 61/847,441, filed Jul. 17, 2013.

Comparative compounds used in the following polymerization examples include:

rac-(PhC$_2$H$_4$)$_2$Si(4,7-Me$_2$Ind)$_2$HfMe$_2$ (Catalyst ID in table 1, C-A)

rac-(n-C$_6$H$_{13}$)$_2$Si[4,7-Me$_2$Ind]$_2$HfMe$_2$ (Catalyst ID in table 1, C-B)

rac-(Me$_2$Si)$_2$[4,7-Me$_2$Ind]$_2$HfMe$_2$ (Catalyst ID in table 1, C-C)

rac-CH$_2$CH$_2$[5-t-Bu-7-MeInd]$_2$HfMe$_2$ (Catalyst ID in table 1, C-D)

rac-Me$_2$Si[2-Me-4-PhInd]$_2$ZrMe$_2$ (Catalyst ID in tables 1, C-E)

rac-Me2Si[2-Me-3-nPrInd]2HfMe$_2$ (Catalyst ID in table 1, C-F)

rac-Me$_2$Si[Ind]$_2$HfMe$_2$ (Catalyst ID in table 1, C-G), wherein Ind=indenyl, Me=methyl, n-C$_6$H$_{13}$=n-hexyl, nPr=n-propyl, Ph=phenyl, PhC$_2$H$_4$=phenethyl, tBu=tert-butyl, CH$_2$CH$_2$=ethylene.

High Throughput Polymerization Examples

Solutions of the pre-catalysts were made using toluene (ExxonMobil Chemical Company anhydrous, stored under N$_2$) (98%). Pre-catalyst solutions were typically 0.5 mmol/L. When noted, some pre-catalysts were pre-alkylated using triisobutyl aluminum (TiBAl, neat, AkzoNobel); prealkylation was performed by first dissolving the pre-catalyst in the appropriate amount of toluene, and then adding 20 equivalents of TiBAl such that the final pre-catalyst solution was 0.5 mmol precatalyst/L and 10 mmol TiBAl/L.

Solvents, polymerization grade toluene and/or isohexanes were supplied by ExxonMobil Chemical Co. and are purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

Polymerization grade ethylene was used and further purified by passing it through a series of columns: 500 cc Oxyclear cylinder from Labclear (Oakland, Calif.) followed by a 500 cc column packed with dried 3 Å mole sieves (8-12 mesh; Aldrich Chemical Company), and a 500 cc column packed with dried 5 Å mole sieves (8-12 mesh; Aldrich Chemical Company).

Polymerization grade propylene was used and further purified by passing it through a series of columns: 2250 cc Oxiclear cylinder from Labclear followed by a 2250 cc column packed with 3 Å mole sieves (8-12 mesh; Aldrich Chemical Company), then two 500 cc columns in series packed with 5 Å mole sieves (8-12 mesh; Aldrich Chemical Company), then a 500 cc column packed with Selexsorb CD (BASF), and finally a 500 cc column packed with Selexsorb COS (BASF).

Activation of the pre-catalysts was either by methylalumoxane (MAO, 10 wt % in toluene, Albemarle Corp.), dimethylanilinium tetrakisperfluorophenylborate (Boulder Scientific and Albemarle Corp) or dimethylanilinium tetrakis(perfluoronaphthyl)borate (Albemarle Corp). MAO was used as a 0.5 wt % or 1.0 wt % in toluene solution. Micromoles of MAO reported in the experimental section are based on the micromoles of aluminum in MAO. The formula weight of MAO is 58.0 grams/mole. Dimethylanilinium tetrakisperfluorophenylborate and dimethylanilinium tetrakis(perfluoronaphthyl)borate were typically used as a 5 mmol/L solution in toluene.

For polymerization runs using dimethylanilinium tetrakisperfluorophenylborate or dimethylanilinium tetrakis(perfluoronaphthyl)borate, tri-n-octylaluminum (TnOAl, Neat, AkzoNobel) was also used as a scavenger prior to introduction of the activator and pre-catalyst into the reactor. TnOAl was typically used as a 5 mmol/L solution in toluene.

Reactor Description and Preparation:

Polymerizations were conducted in an inert atmosphere (N$_2$) drybox using autoclaves equipped with an external heater for temperature control, glass inserts (internal 22.5 mL for C$_3$ and C$_2$/C$_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Propylene Polymerization (PP):

The reactor was prepared as described above, then heated to 40° C., and then purged with propylene gas at atmospheric pressure. For MAO activated runs, toluene or isohexane, MAO, and liquid propylene (1.0 mL) were added via syringe. The reactor was then heated to process temperature (70° C. or 100° C.) while stirring at 800 RPM. The pre-catalyst solution was added via syringe with the reactor at process conditions. For dimethylanilinium tetrakisperfluorophenylborate or dimethylanilinium tetrakisperfluoronaphthylborate activated runs, isohexanes, liquid propylene (1.0 mL) and scavenger (TnOAl, 0.5 µmol) were added via syringe. The reactor was then brought to process temperature (70° C. or 100° C.) while stirring at 800 RPM. The activator solution, followed by the pre-catalyst solution, were injected via syringe to the reactor at process conditions. Reactor temperature was monitored and typically maintained within +/−1° C. Polymerizations were halted by addition of approximately 50 psi O$_2$/Ar (5 mole % O$_2$) gas mixture to the autoclaves for approximately 30 seconds. The polymerizations were quenched based on a predetermined pressure loss of approximately 8-20 psi (max quench value in psi) or for a maximum of 30 minutes polymerization time for experiments listed in Table 2, or for a maximum of 45 minutes polymerization time for experiments listed in Table 1. The reactors were cooled and vented. The polymers were isolated after the solvent was removed in-vacuo. The actual quench time (s) and max quench value (psi) are reported. Yields reported include total weight of polymer and residual catalyst. Catalyst activity is reported as grams of polymer per mmol transition metal compound per hour of reaction time (g/mmol·hr). Propylene homopolymerization examples are reported in Table 1 (Ex# starting with PP or CPP only) and in Table 2.

Ethylene-Propylene Copolymerization (EP):

The reactor was prepared as described above, then heated to 40° C. and then purged with ethylene gas at atmospheric pressure. The listed ethylene pressure (10, 20, 40, 60 or 80 psid) was then added to the reactor. Isohexanes and scavenger (TnOAl, 0.5 µmol) were added via syringe. The stirrers were then started and maintained at 800 RPM. Liquid propylene (1.0 ml) was then injected into the reactor. The reactor was then brought to process temperature (70° C.). The activator solution, followed by the pre-catalyst solution, was injected via syringe to the reactor at process conditions. Reactor temperature was monitored and typically maintained within +/−1° C. Polymerizations were halted by addition of approximately 50 psi O$_2$/Ar (5 mole % O$_2$) gas mixture to the autoclaves for approximately 30 seconds. The polymerizations were quenched based on a predetermined pressure loss of approximately 10-20 psi or for a maximum of 45 minutes polymerization time. The reactors were cooled and vented. The polymer was isolated after the solvent was removed in-vacuo. The quench time (s) and max quench value (psi) are reported in Table 1 for each run. Yields reported include total weight of polymer and residual catalyst. Catalyst activity is reported as grams of polymer per mmol transition metal compound per hour of reaction time (g/mmol·hr). Ethylene/propylene copolymerization examples are collected in Table 1.

High Throughput Polymer Characterization

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples (250 μL of a polymer solution in TCB were injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies. The molecular weights obtained are relative to linear polystyrene standards. Molecular weight data is reported in Tables 1 and 2 under the headings Mn, Mw and PDI as defined above.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period. The results are reported in the Tables 1 and 2 under the heading, $T_m$ (° C.).

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes' MappIR specular reflectance sample accessory. Spectra, covering a spectral range of 5000 cm$^{-1}$ to 500 cm$^{-1}$, were collected at a 2 cm$^{-1}$ resolution with 32 scans.

For ethylene-propylene copolymers, the wt. % ethylene is determined via measurement of the methylene rocking band (~770 cm$^{-1}$ to 700 cm-1). The peak area of this band is normalized by sum of the band areas of the combination and overtone bands in the 4500 cm$^{-1}$ to 4000 cm$^{-1}$ range. The normalized band area is then correlated to a calibration curve from $^{13}$C NMR data to predict the wt. % ethylene within a concentration range of ~5 to 40 wt. %. Typically, $R^2$ correlations of 0.98 or greater are achieved. These numbers are reported in Table 1 under the heading C2 wt. %.

$^{13}$C NMR spectroscopy was used to characterize some polypropylene polymer samples produced in experiments collected in Table 3. Unless otherwise indicated the polymer samples for $^{13}$C NMR spectroscopy were dissolved in d$_2$-1,1,2,2-tetrachloroethane and the samples were recorded at 125° C. using a NMR spectrometer with a $^{13}$C NMR frequency of 150 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977.

The stereodefects measured as "stereo defects/10,000 monomer units" are calculated from the sum of the intensities of mmrr, mmrm+rrmr, and rmrm resonance peaks times 5000. The intensities used in the calculations are normalized to the total number of monomers in the sample. Methods for measuring 2,1 regio defects/10,000 monomers and 1,3 regio defects/10,000 monomers follow standard methods. Additional references include Grassi, A. et. al. *Macromolecules*, 1988, 21, 617-622 and Busico et. al. *Macromolecules*, 1994, 27, 7538-7543. The average meso run length=10000/[(stereo defects/10000 C)+(2,1-regio defects/10000 C)+(1,3-regio-defects/10000 C)].

For some samples, polymer end-group analysis was determined by $^1$H NMR using a Varian Unity+400 MHz instrument run with a single 30° flip angle, RF pulse. 120 pulses with a delay of 8 seconds between pulses were signal averaged. The polymer sample was dissolved in heated d$_2$-1,1,2,2-tetrachloroethane and signal collection took place at 120° C. Vinylenes were measured as the number of vinylenes per 1000 carbon atoms using the resonances between 5.55-5.31 ppm. Trisubstituted end-groups ("trisubs") were measured as the number of trisubstituted groups per 1000 carbon atoms using the resonances between 5.30-5.11 ppm. Vinyl end-groups were measured as the number of vinyls per 1000 carbon atoms using the resonances between 5.13-4.98 ppm. Vinylidene end-groups were measured as the number of vinylidenes per 1000 carbon atoms using the resonances between 4.88-4.69 ppm. The values reported in Table 1 are % vinylene, % trisubstituted (% trisub), % vinyl and % vinylidene where the percentage is relative to the total olefinic unsaturation per 1000 carbon atoms.

Polymerization results are collected in Tables 1, 2 and 3 below. "Ex#" stands for example number. Under the Ex# column heading, the following abbreviations are defined: PP=polypropylene, EP=ethylene-propylene; CPP=comparative polypropylene, CEP=comparative ethylene-propylene, Examples starting with a "C" as in CPP and CEP are comparative examples. "Cat ID" identifies the pre-catalyst used in the experiment. Corresponding numbers identifying the pre-catalyst are located above. Comparative pre-catalysts are named with a "C" followed by a dash and a letter, such as C-A. An asterisk next to the Cat ID number would indicate that the pre-catalyst was pre-alkylated with 20 equivalents of TiBAl. "Act ID" identifies the activator used. "A" corresponds to MAO, "B" corresponds to dimethylanilinium tetrakisperfluorophenylborate, and "C" corresponds to dimethylanilinium tetrakisperfluoronaphthylborate. "Cat (μmol)" is the amount of pre-catalyst added to the reactor. For all experiments using MAO as the activator, the molar ratio of activator/pre-catalyst was 500. For all experiments using borate activators B or C, the molar ratio of activator/pre-catalyst was 1.1. T(° C.) is the polymerization temperature which was typically maintained within +/−1° C. "Yield" is polymer yield, and is not corrected for catalyst residue. "Quench time (s)" is the actual duration of the polymerization run in seconds. "Quench Value (psi)" for ethylene based polymerization runs is the set maximum amount of ethylene uptake (conversion) for the experiment. For propylene homopolymerization or ethylene-propylene copolymerizations runs, quench value indicates the maximum set pressure loss (conversion) during the polymerization.

TABLE 1

Propylene polymerization & Ethylene-propylene copolymerization examples.

| Ex# | Cat ID | Act ID | Cat (umol) | Isohexane (uL) | Toluene (uL) | T (° C.) | C2 (psig) | Quench Value (psi) | quench time (s) | yield (g) | Activity (g P/mmol cat · hr) |
|---|---|---|---|---|---|---|---|---|---|---|---|
| PP-1 | 2 | B | 0.025 | 3869 | 231 | 70 | 0 | 15 | 32 | 0.2408 | 1,070,222 |
| PP-2 | 2 | B | 0.025 | 3869 | 231 | 70 | 0 | 15 | 29 | 0.2728 | 1,345,315 |
| PP-3 | 2 | B | 0.025 | 3869 | 231 | 70 | 0 | 15 | 36 | 0.3330 | 1,317,363 |
| EP-1 | 2 | B | 0.025 | 3849 | 231 | 70 | 10 | 15 | 25 | 0.3019 | 1,738,944 |
| EP-2 | 2 | B | 0.025 | 3829 | 231 | 70 | 20 | 15 | 22 | 0.3053 | 1,971,444 |
| EP-3 | 2 | B | 0.025 | 3829 | 231 | 70 | 20 | 15 | 24 | 0.3097 | 1,897,736 |
| EP-4 | 2 | B | 0.025 | 3809 | 231 | 70 | 40 | 15 | 17 | 0.3197 | 2,740,286 |
| EP-5 | 2 | B | 0.025 | 3809 | 231 | 70 | 40 | 15 | 18 | 0.3268 | 2,614,400 |
| EP-6 | 2 | B | 0.025 | 3789 | 231 | 70 | 60 | 15 | 17 | 0.3218 | 2,758,286 |
| EP-7 | 2 | B | 0.025 | 3789 | 231 | 70 | 60 | 15 | 14 | 0.3330 | 3,425,143 |
| EP-8 | 2 | B | 0.025 | 3769 | 231 | 70 | 80 | 15 | 16 | 0.3254 | 2,928,600 |
| EP-9 | 2 | B | 0.025 | 3769 | 231 | 70 | 80 | 15 | 14 | 0.3459 | 3,662,471 |
| PP-4 | 2 | B | 0.012 | 3916 | 184 | 70 | 0 | 15 | 73 | 0.1714 | 700,545 |
| PP-5 | 2 | B | 0.012 | 3916 | 184 | 70 | 0 | 15 | 79 | 0.2490 | 946,768 |
| PP-6 | 2 | B | 0.012 | 3916 | 184 | 100 | 0 | 15 | 92 | 0.1555 | 504,870 |
| PP-7 | 2 | B | 0.012 | 3916 | 184 | 100 | 0 | 15 | 68 | 0.1661 | 738,222 |
| PP-8 | 2 | B | 0.015 | 3895 | 205 | 70 | 0 | 15 | 66 | 0.2865 | 1,041,818 |
| PP-9 | 2 | B | 0.015 | 3895 | 205 | 70 | 0 | 15 | 64 | 0.2663 | 1,003,328 |
| PP-10 | 2 | B | 0.015 | 3895 | 205 | 100 | 0 | 15 | 88 | 0.1681 | 457,415 |
| PP-11 | 2 | B | 0.015 | 3895 | 205 | 100 | 0 | 15 | 79 | 0.1815 | 550,000 |
| PP-12 | 2 | C | 0.012 | 3916 | 184 | 70 | 0 | 15 | 90 | 0.2335 | 779,199 |
| PP-13 | 2 | C | 0.012 | 3916 | 184 | 70 | 0 | 15 | 113 | 0.2297 | 610,904 |
| PP-14 | 2 | C | 0.012 | 3916 | 184 | 100 | 0 | 15 | 138 | 0.1663 | 360,999 |
| PP-15 | 2 | C | 0.012 | 3916 | 184 | 100 | 0 | 15 | 73 | 0.1971 | 814,463 |
| PP-16 | 2 | C | 0.015 | 3895 | 205 | 70 | 0 | 15 | 243 | 0.1566 | 154,986 |
| PP-17 | 2 | C | 0.015 | 3895 | 205 | 70 | 0 | 15 | 142 | 0.1520 | 256,180 |
| PP-18 | 2 | C | 0.015 | 3895 | 205 | 100 | 0 | 15 | 88 | 0.1644 | 446,840 |
| PP-19 | 2 | C | 0.015 | 3895 | 205 | 100 | 0 | 15 | 66 | 0.1983 | 723,283 |
| PP-20 | 12 | B | 0.020 | 3790 | 310 | 70 | 0 | 20 | 154 | 0.2265 | 264,054 |
| PP-21 | 12 | B | 0.020 | 3790 | 310 | 70 | 0 | 20 | 159 | 0.1751 | 198,226 |
| EP-10 | 12 | B | 0.020 | 3770 | 310 | 70 | 10 | 20 | 100 | 0.2047 | 368,460 |
| EP-11 | 12 | B | 0.020 | 3770 | 310 | 70 | 10 | 20 | 112 | 0.1877 | 302,471 |
| EP-12 | 12 | B | 0.020 | 3750 | 310 | 70 | 20 | 20 | 93 | 0.1998 | 385,054 |
| EP-13 | 12 | B | 0.020 | 3750 | 310 | 70 | 20 | 20 | 91 | 0.2064 | 409,163 |
| EP-14 | 12 | B | 0.020 | 3730 | 310 | 70 | 40 | 20 | 75 | 0.2028 | 486,072 |
| EP-15 | 12 | B | 0.020 | 3730 | 310 | 70 | 40 | 20 | 74 | 0.2148 | 523,194 |
| EP-16 | 12 | B | 0.020 | 3710 | 310 | 70 | 60 | 20 | 55 | 0.2453 | 810,165 |
| EP-17 | 12 | B | 0.020 | 3710 | 310 | 70 | 60 | 20 | 58 | 0.2615 | 811,552 |
| EP-18 | 12 | B | 0.020 | 3690 | 310 | 70 | 80 | 20 | 47 | 0.2873 | 1,112,129 |
| EP-19 | 12 | B | 0.020 | 3690 | 310 | 70 | 80 | 20 | 43 | 0.2860 | 1,200,000 |
| PP-22 | 14 | B | 0.020 | 3790 | 310 | 70 | 0 | 20 | 144 | 0.2353 | 293,310 |
| PP-23 | 14 | B | 0.020 | 3790 | 310 | 70 | 0 | 20 | 156 | 0.2393 | 275,585 |
| PP-24 | 14 | B | 0.040 | 3832 | 268 | 70 | 0 | 15 | 98 | 0.2318 | 212,228 |
| PP-25 | 14 | B | 0.040 | 3832 | 268 | 70 | 0 | 15 | 96 | 0.2349 | 220,448 |
| PP-26 | 14 | B | 0.040 | 3832 | 268 | 100 | 0 | 15 | 107 | 0.1530 | 129,296 |
| PP-27 | 14 | B | 0.040 | 3832 | 268 | 100 | 0 | 15 | 64 | 0.1855 | 260,452 |
| EP-20 | 14 | B | 0.020 | 3770 | 310 | 70 | 10 | 20 | 78 | 0.2129 | 492,571 |
| EP-21 | 14 | B | 0.020 | 3770 | 310 | 70 | 10 | 20 | 68 | 0.2240 | 589,474 |
| EP-22 | 14 | B | 0.020 | 3750 | 310 | 70 | 20 | 20 | 61 | 0.2170 | 644,554 |
| EP-23 | 14 | B | 0.020 | 3750 | 310 | 70 | 20 | 20 | 66 | 0.2364 | 648,659 |
| EP-24 | 14 | B | 0.020 | 3730 | 310 | 70 | 40 | 20 | 64 | 0.2327 | 653,448 |
| EP-25 | 14 | B | 0.020 | 3730 | 310 | 70 | 40 | 20 | 52 | 0.2404 | 835,367 |
| EP-26 | 14 | B | 0.025 | 3855 | 205 | 70 | 40 | 15 | 79 | 0.1662 | 301,421 |
| EP-27 | 14 | B | 0.025 | 3855 | 205 | 70 | 40 | 15 | 46 | 0.1978 | 624,632 |
| EP-28 | 14 | B | 0.025 | 3855 | 205 | 100 | 40 | 15 | 53 | 0.1552 | 422,473 |
| EP-29 | 14 | B | 0.025 | 3855 | 205 | 100 | 40 | 15 | 45 | 0.1622 | 520,196 |
| EP-30 | 14 | B | 0.020 | 3710 | 310 | 70 | 60 | 20 | 55 | 0.2484 | 812,945 |
| EP-31 | 14 | B | 0.020 | 3710 | 310 | 70 | 60 | 20 | 50 | 0.2831 | 1,011,071 |
| EP-32 | 14 | B | 0.025 | 3835 | 205 | 70 | 60 | 15 | 50 | 0.2182 | 630,940 |
| EP-33 | 14 | B | 0.025 | 3835 | 205 | 70 | 60 | 15 | 37 | 0.2686 | 1,039,742 |
| EP-34 | 14 | B | 0.025 | 3835 | 205 | 100 | 60 | 15 | 35 | 0.1695 | 695,385 |
| EP-35 | 14 | B | 0.025 | 3835 | 205 | 100 | 60 | 15 | 31 | 0.1761 | 818,013 |
| EP-36 | 14 | B | 0.020 | 3690 | 310 | 70 | 80 | 20 | 41 | 0.2630 | 1,163,145 |
| EP-37 | 14 | B | 0.020 | 3690 | 310 | 70 | 80 | 20 | 36 | 0.2650 | 1,336,134 |

TABLE 1-continued

Propylene polymerization & Ethylene-propylene copolymerization examples.

| | | | | | | | | | | | |
|---|---|---|---|---|---|---|---|---|---|---|---|
| PP-28 | 14 | C | 0.040 | 3832 | 268 | 70 | 0 | 15 | 289 | 0.1597 | 49,820 |
| PP-29 | 14 | C | 0.040 | 3832 | 268 | 70 | 0 | 15 | 202 | 0.1732 | 77,168 |
| PP-30 | 14 | C | 0.040 | 3832 | 268 | 100 | 0 | 15 | 149 | 0.1509 | 91,455 |
| PP-31 | 14 | C | 0.040 | 3832 | 268 | 100 | 0 | 15 | 182 | 0.1421 | 70,231 |
| EP-38 | 14 | C | 0.025 | 3855 | 205 | 70 | 40 | 15 | 57 | 0.2299 | 576,753 |
| EP-39 | 14 | C | 0.025 | 3855 | 205 | 70 | 40 | 15 | 71 | 0.2006 | 409,736 |
| EP-40 | 14 | C | 0.025 | 3855 | 205 | 100 | 40 | 15 | 51 | 0.1450 | 413,465 |
| EP-41 | 14 | C | 0.025 | 3855 | 205 | 100 | 40 | 15 | 44 | 0.1710 | 564,771 |
| EP-42 | 14 | C | 0.025 | 3835 | 205 | 70 | 60 | 15 | 35 | 0.2880 | 1,171,525 |
| EP-43 | 14 | C | 0.025 | 3835 | 205 | 100 | 60 | 15 | 48 | 0.1611 | 485,322 |
| EP-44 | 14 | C | 0.025 | 3835 | 205 | 100 | 60 | 15 | 51 | 0.1472 | 414,810 |
| PP-32 | 16 | B | 0.012 | 3899 | 201 | 70 | 0 | 10 | 111 | 0.1903 | 514,324 |
| PP-33 | 16 | B | 0.012 | 3899 | 201 | 70 | 0 | 10 | 123 | 0.2105 | 513,415 |
| EP-45 | 16 | B | 0.012 | 3879 | 201 | 70 | 10 | 10 | 33 | 0.2823 | 2,589,908 |
| EP-46 | 16 | B | 0.012 | 3879 | 201 | 70 | 10 | 10 | 31 | 0.2501 | 2,436,039 |
| EP-47 | 16 | B | 0.012 | 3859 | 201 | 70 | 20 | 10 | 28 | 0.2713 | 2,927,698 |
| EP-48 | 16 | B | 0.012 | 3859 | 201 | 70 | 20 | 10 | 28 | 0.2819 | 3,042,086 |
| EP-49 | 16 | B | 0.012 | 3839 | 201 | 70 | 40 | 10 | 22 | 0.2818 | 3,808,108 |
| EP-50 | 16 | B | 0.012 | 3839 | 201 | 70 | 40 | 10 | 24 | 0.3049 | 3,827,197 |
| EP-51 | 16 | B | 0.012 | 3819 | 201 | 70 | 60 | 10 | 18 | 0.2868 | 4,861,017 |
| EP-52 | 16 | B | 0.012 | 3819 | 201 | 70 | 60 | 10 | 18 | 0.3357 | 5,657,865 |
| EP-53 | 16 | B | 0.012 | 3799 | 201 | 70 | 80 | 10 | 15 | 0.3107 | 6,052,597 |
| EP-54 | 16 | B | 0.012 | 3799 | 201 | 70 | 80 | 10 | 13 | 0.3002 | 6,874,809 |
| CPP-1 | C-A | B | 0.020 | 3790 | 310 | 70 | 0 | 20 | 119 | 0.2449 | 372,000 |
| CPP-2 | C-A | B | 0.020 | 3790 | 310 | 70 | 0 | 20 | 133 | 0.2616 | 354,578 |
| CEP-1 | C-A | B | 0.020 | 3770 | 310 | 70 | 10 | 20 | 92 | 0.1996 | 390,098 |
| CEP-2 | C-A | B | 0.020 | 3770 | 310 | 70 | 10 | 20 | 106 | 0.2013 | 341,830 |
| CEP-3 | C-A | B | 0.020 | 3750 | 310 | 70 | 20 | 20 | 99 | 0.1781 | 323,491 |
| CEP-4 | C-A | B | 0.020 | 3750 | 310 | 70 | 20 | 20 | 101 | 0.1954 | 348,583 |
| CEP-5 | C-A | B | 0.020 | 3730 | 310 | 70 | 40 | 20 | 77 | 0.1900 | 443,005 |
| CEP-6 | C-A | B | 0.020 | 3730 | 310 | 70 | 40 | 20 | 74 | 0.2010 | 488,919 |
| CEP-7 | C-A | B | 0.020 | 3710 | 310 | 70 | 60 | 20 | 62 | 0.1996 | 581,359 |
| CEP-8 | C-A | B | 0.020 | 3710 | 310 | 70 | 60 | 20 | 67 | 0.2271 | 612,864 |
| CEP-9 | C-A | B | 0.020 | 3690 | 310 | 70 | 80 | 20 | 44 | 0.1503 | 619,085 |
| CEP-10 | C-A | B | 0.020 | 3690 | 310 | 70 | 80 | 20 | 45 | 0.1803 | 722,806 |
| CPP-3 | C-B | B | 0.020 | 3790 | 310 | 70 | 0 | 20 | 158 | 0.2327 | 265,943 |
| CPP-4 | C-B | B | 0.020 | 3790 | 310 | 70 | 0 | 20 | 159 | 0.2146 | 243,096 |
| CEP-11 | C-B | B | 0.020 | 3770 | 310 | 70 | 10 | 20 | 107 | 0.1954 | 328,097 |
| CEP-12 | C-B | B | 0.020 | 3770 | 310 | 70 | 10 | 20 | 97 | 0.2165 | 400,926 |
| CEP-13 | C-B | B | 0.020 | 3750 | 310 | 70 | 20 | 20 | 85 | 0.2107 | 448,298 |
| CEP-14 | C-B | B | 0.020 | 3750 | 310 | 70 | 20 | 20 | 75 | 0.2229 | 533,537 |
| CEP-15 | C-B | B | 0.020 | 3730 | 310 | 70 | 40 | 20 | 76 | 0.2110 | 503,046 |
| CEP-16 | C-B | B | 0.020 | 3730 | 310 | 70 | 40 | 20 | 67 | 0.2206 | 589,139 |
| CEP-17 | C-B | B | 0.020 | 3710 | 310 | 70 | 60 | 20 | 57 | 0.2388 | 752,785 |
| CEP-18 | C-B | B | 0.020 | 3710 | 310 | 70 | 60 | 20 | 59 | 0.2460 | 756,923 |
| CEP-19 | C-B | B | 0.020 | 3690 | 310 | 70 | 80 | 20 | 43 | 0.2672 | 1,129,014 |
| CEP-20 | C-B | B | 0.020 | 3690 | 310 | 70 | 80 | 20 | 41 | 0.2701 | 1,197,488 |
| CPP-5 | C-C | B | 0.080 | 3664 | 436 | 70 | 0 | 12 | 2423 | 0.1071 | 1,989 |
| CPP-6 | C-C | B | 0.080 | 3664 | 436 | 70 | 0 | 12 | 2215 | 0.1037 | 2,107 |
| CEP-21 | C-C | B | 0.040 | 3812 | 268 | 70 | 10 | 12 | 1212 | 0.0795 | 5,905 |
| CEP-22 | C-C | B | 0.040 | 3812 | 268 | 70 | 10 | 12 | 930 | 0.0778 | 7,531 |
| CEP-23 | C-C | B | 0.040 | 3792 | 268 | 70 | 20 | 12 | 676 | 0.0807 | 10,741 |
| CEP-24 | C-C | B | 0.040 | 3792 | 268 | 70 | 20 | 12 | 576 | 0.0812 | 12,688 |
| CEP-25 | C-C | B | 0.040 | 3772 | 268 | 70 | 40 | 12 | 327 | 0.0761 | 20,932 |
| CEP-26 | C-C | B | 0.040 | 3772 | 268 | 70 | 40 | 12 | 324 | 0.0779 | 21,619 |
| CEP-27 | C-C | B | 0.040 | 3752 | 268 | 70 | 60 | 12 | 221 | 0.0769 | 31,317 |
| CEP-28 | C-C | B | 0.040 | 3752 | 268 | 70 | 60 | 12 | 206 | 0.0777 | 33,897 |
| CEP-29 | C-C | B | 0.040 | 3732 | 268 | 70 | 80 | 12 | 160 | 0.0825 | 46,319 |
| CEP-30 | C-C | B | 0.040 | 3732 | 268 | 70 | 80 | 12 | 169 | 0.0840 | 44,813 |
| CPP-7 | C-D | B | 0.025 | 3869 | 231 | 70 | 0 | 12 | 209 | 0.1795 | 123,438 |
| CPP-8 | C-D | B | 0.025 | 3869 | 231 | 70 | 0 | 12 | 191 | 0.1721 | 130,023 |
| CEP-31 | C-D | B | 0.025 | 3849 | 231 | 70 | 10 | 12 | 130 | 0.1845 | 205,000 |
| CEP-32 | C-D | B | 0.025 | 3849 | 231 | 70 | 10 | 12 | 81 | 0.2568 | 457,098 |
| CEP-33 | C-D | B | 0.025 | 3829 | 231 | 70 | 20 | 12 | 121 | 0.1647 | 195,683 |
| CEP-34 | C-D | B | 0.025 | 3829 | 231 | 70 | 20 | 12 | 182 | 0.1248 | 98,580 |
| CEP-35 | C-D | B | 0.025 | 3809 | 231 | 70 | 40 | 12 | 42 | 0.2829 | 969,943 |
| CEP-36 | C-D | B | 0.025 | 3809 | 231 | 70 | 40 | 12 | 49 | 0.3139 | 926,262 |
| CEP-37 | C-D | B | 0.025 | 3789 | 231 | 70 | 60 | 12 | 103 | 0.1457 | 203,302 |
| CEP-38 | C-D | B | 0.025 | 3789 | 231 | 70 | 60 | 12 | 34 | 0.2770 | 1,183,620 |
| CEP-39 | C-D | B | 0.025 | 3769 | 231 | 70 | 80 | 12 | 39 | 0.2553 | 942,646 |
| CEP-40 | C-D | B | 0.025 | 3769 | 231 | 70 | 80 | 12 | 32 | 0.3078 | 1,402,633 |
| CPP-9 | C-E | B | 0.015 | 3843 | 257 | 70 | 0 | 20 | 66 | 0.3674 | 1,346,198 |
| CPP-10 | C-E | B | 0.015 | 3843 | 257 | 70 | 0 | 20 | 71 | 0.3655 | 1,237,236 |
| CPP-11 | C-E | B | 0.015 | 3843 | 257 | 70 | 0 | 20 | 72 | 0.3585 | 1,195,000 |
| CPP-12 | C-E | B | 0.015 | 3843 | 257 | 70 | 0 | 20 | 71 | 0.3706 | 1,261,617 |
| CEP-41 | C-E | B | 0.015 | 3803 | 257 | 70 | 40 | 20 | 22 | 0.3874 | 4,169,327 |
| CEP-42 | C-E | B | 0.015 | 3803 | 257 | 70 | 40 | 20 | 22 | 0.3980 | 4,422,222 |
| CEP-43 | C-E | B | 0.015 | 3803 | 257 | 70 | 40 | 20 | 23 | 0.3957 | 4,183,612 |

TABLE 1-continued

Propylene polymerization & Ethylene-propylene copolymerization examples.

| | | | | | | | | | | | |
|---|---|---|---|---|---|---|---|---|---|---|---|
| CEP-44 | C-E | B | 0.015 | 3803 | 257 | 70 | 40 | 20 | 22 | 0.3927 | 4,363,333 |
| CEP-45 | C-E | B | 0.015 | 3763 | 257 | 70 | 80 | 20 | 17 | 0.4360 | 6,048,555 |
| CEP-46 | C-E | B | 0.015 | 3763 | 257 | 70 | 80 | 20 | 17 | 0.4172 | 5,855,439 |
| CEP-47 | C-E | B | 0.015 | 3763 | 257 | 70 | 80 | 20 | 19 | 0.4824 | 6,224,516 |
| CEP-48 | C-E | B | 0.015 | 3763 | 257 | 70 | 80 | 20 | 21 | 0.3735 | 4,372,683 |
| CPP-13 | C-F | B | 0.080 | 3580 | 520 | 70 | 0 | 20 | 83 | 0.2652 | 143,438 |
| CPP-14 | C-F | B | 0.080 | 3580 | 520 | 70 | 0 | 20 | 84 | 0.2887 | 154,661 |
| CEP-49 | C-F | B | 0.020 | 3875 | 205 | 70 | 10 | 20 | 98 | 0.1914 | 350,122 |
| CEP-50 | C-F | B | 0.020 | 3875 | 205 | 70 | 10 | 20 | 106 | 0.2207 | 374,420 |
| CEP-51 | C-F | B | 0.020 | 3855 | 205 | 70 | 20 | 20 | 78 | 0.2103 | 487,809 |
| CEP-52 | C-F | B | 0.020 | 3855 | 205 | 70 | 20 | 20 | 84 | 0.2063 | 444,719 |
| CEP-53 | C-F | B | 0.020 | 3835 | 205 | 70 | 40 | 20 | 46 | 0.2231 | 867,343 |
| CEP-54 | C-F | B | 0.020 | 3835 | 205 | 70 | 40 | 20 | 57 | 0.2344 | 740,211 |
| CEP-55 | C-F | B | 0.020 | 3815 | 205 | 70 | 60 | 20 | 46 | 0.2233 | 883,385 |
| CEP-56 | C-F | B | 0.020 | 3815 | 205 | 70 | 60 | 20 | 35 | 0.2408 | 1,252,717 |
| CEP-57 | C-F | B | 0.020 | 3795 | 205 | 70 | 80 | 20 | 30 | 0.2516 | 1,509,600 |
| CEP-58 | C-F | B | 0.020 | 3795 | 205 | 70 | 80 | 20 | 27 | 0.2481 | 1,672,584 |
| CPP-15 | C-G | B | 0.02 | 3895 | 205 | 70 | 0 | 15 | 112 | 0.2269 | 364,335 |
| CPP-16 | C-G | B | 0.02 | 3895 | 205 | 70 | 0 | 15 | 132 | 0.2082 | 283,265 |
| CEP-59 | C-G | B | 0.02 | 3875 | 205 | 70 | 10 | 15 | 65 | 0.2344 | 654,140 |
| CEP-60 | C-G | B | 0.02 | 3875 | 205 | 70 | 10 | 15 | 56 | 0.2693 | 871,835 |
| CEP-61 | C-G | B | 0.02 | 3855 | 205 | 70 | 20 | 15 | 54 | 0.2493 | 834,089 |
| CEP-62 | C-G | B | 0.02 | 3855 | 205 | 70 | 20 | 15 | 55 | 0.2478 | 813,942 |
| CEP-63 | C-G | B | 0.02 | 3835 | 205 | 70 | 40 | 15 | 64 | 0.2212 | 620,187 |
| CEP-64 | C-G | B | 0.02 | 3835 | 205 | 70 | 40 | 15 | 41 | 0.2896 | 1,268,321 |
| CEP-65 | C-G | B | 0.02 | 3815 | 205 | 70 | 60 | 15 | 48 | 0.2622 | 979,170 |
| CEP-66 | C-G | B | 0.02 | 3815 | 205 | 70 | 60 | 15 | 60 | 0.2375 | 714,883 |
| CEP-67 | C-G | B | 0.02 | 3795 | 205 | 70 | 80 | 15 | 46 | 0.2484 | 982,681 |
| CEP-68 | C-G | B | 0.02 | 3795 | 205 | 70 | 80 | 15 | 36 | 0.3227 | 1,636,225 |

| Ex# | Mn | Mw | PDI | C2 (wt %) | Tm (° C.) | % vinylene | % trisub | % vinyl | % vinylidene |
|---|---|---|---|---|---|---|---|---|---|
| PP-1 | 9,638 | 28,402 | 2.95 | | 141.3 | 0.0 | 7.2 | 79.3 | 13.5 |
| PP-2 | 9,852 | 27,279 | 2.77 | | 140.7 | 1.1 | 2.6 | 81.6 | 14.7 |
| PP-3 | 8,027 | 26,634 | 3.32 | | 140.6 | 0.0 | 1.5 | 83.8 | 14.7 |
| EP-1 | 9,950 | 34,071 | 3.42 | 6.7 | 100.3 | 0.8 | 1.6 | 82.6 | 15.1 |
| EP-2 | 10,701 | 38,543 | 3.60 | 11.2 | 90.1 | 0.0 | 1.5 | 83.1 | 15.4 |
| EP-3 | 10,167 | 38,311 | 3.77 | 9.4 | 91.9 | 0.0 | 1.1 | 85.1 | 13.8 |
| EP-4 | 9,576 | 41,253 | 4.31 | 14.6 | | 0.0 | 0.9 | 84.5 | 14.5 |
| EP-5 | 9,235 | 40,154 | 4.35 | 13.6 | | 0.0 | 1.4 | 84.6 | 13.9 |
| EP-6 | 9,301 | 44,887 | 4.83 | 15.3 | | 0.6 | 2.3 | 82.7 | 14.3 |
| EP-7 | 9,096 | 42,947 | 4.72 | 17.4 | | 0.8 | 2.9 | 82.1 | 14.2 |
| EP-8 | 10,427 | 51,822 | 4.97 | 19.2 | | 1.2 | 4.3 | 80.9 | 13.7 |
| EP-9 | 9,147 | 49,408 | 5.40 | 27.8 | | 1.9 | 7.8 | 77.5 | 12.8 |
| PP-4 | 23,592 | 45,180 | 1.92 | | 146.7 | 0.0 | 8.5 | 74.4 | 17.1 |
| PP-5 | 19,627 | 43,962 | 2.24 | | 145.8 | 4.6 | 5.5 | 77.1 | 12.8 |
| PP-6 | 5,823 | 10,579 | 1.82 | | 138.7 | 0.7 | 2.6 | 88.8 | 7.9 |
| PP-7 | 5,585 | 9,840 | 1.76 | | 136.8 | 0.6 | 5.1 | 85.0 | 9.3 |
| PP-8 | 15,798 | 39,708 | 2.51 | | 144.8 | 2.5 | 14.4 | 66.9 | 16.3 |
| PP-9 | 15,230 | 39,075 | 2.57 | | 144.3 | 0.0 | 2.4 | 87.4 | 10.2 |
| PP-10 | 5,606 | 10,137 | 1.81 | | 138.0 | 1.0 | 3.2 | 89.0 | 6.8 |
| PP-11 | 4,809 | 9,027 | 1.88 | | 136.0 | 1.4 | 3.8 | 87.9 | 6.9 |
| PP-12 | 31,704 | 66,032 | 2.08 | | 147.9 | 0.0 | 10.6 | 80.3 | 9.1 |
| PP-13 | 34,261 | 68,830 | 2.01 | | 148.2 | 2.3 | 16.3 | 73.3 | 8.1 |
| PP-14 | 8,493 | 15,276 | 1.80 | | 140.9 | 0.0 | 0.9 | 93.6 | 5.6 |
| PP-15 | 6,720 | 12,807 | 1.91 | | 138.0 | 1.0 | 2.1 | 92.8 | 4.1 |
| PP-16 | 69,487 | 119,005 | 1.71 | | 152.0 | 3.7 | 16.7 | 59.3 | 20.4 |
| PP-17 | 49,419 | 90,662 | 1.83 | | 150.4 | 0.0 | 11.3 | 75.5 | 13.2 |
| PP-18 | 6,371 | 11,709 | 1.84 | | 137.6 | 0.9 | 2.2 | 93.2 | 3.7 |
| PP-19 | 5,813 | 11,048 | 1.90 | | 136.5 | 0.0 | 1.8 | 94.4 | 3.9 |
| PP-20 | 34,622 | 49,928 | 1.44 | | 139.4 | 0.0 | 0.0 | 54.5 | 45.5 |
| PP-21 | 33,780 | 48,236 | 1.43 | | 139.7 | 0.0 | 14.0 | 56.1 | 29.8 |
| EP-10 | 26,816 | 42,824 | 1.60 | 8.5 | 96.2 | 1.2 | 0.0 | 51.2 | 47.6 |
| EP-11 | 28,678 | 45,051 | 1.57 | 9.0 | 100.2 | 2.6 | 15.7 | 41.7 | 40.0 |
| EP-12 | 28,359 | 45,205 | 1.59 | 11.1 | | 0.0 | 0.0 | 51.9 | 48.1 |
| EP-13 | 28,717 | 46,258 | 1.61 | 9.1 | | 3.3 | 4.4 | 47.8 | 44.4 |
| EP-14 | 33,914 | 55,114 | 1.63 | 15.4 | | 0.0 | 1.4 | 48.6 | 50.0 |
| EP-15 | 30,289 | 50,468 | 1.67 | 13.4 | | 0.0 | 1.1 | 54.4 | 44.4 |
| EP-16 | 28,818 | 51,643 | 1.79 | 17.6 | | 1.0 | 10.3 | 45.4 | 43.3 |
| EP-17 | 25,971 | 47,922 | 1.85 | 16.6 | | 1.1 | 5.3 | 52.6 | 41.1 |
| EP-18 | 21,946 | 48,382 | 2.20 | 20.6 | | 0.9 | 3.5 | 44.2 | 51.3 |
| EP-19 | 23,068 | 47,223 | 2.05 | 20.4 | | 1.0 | 2.9 | 53.3 | 42.9 |
| PP-22 | 23,015 | 34,305 | 1.49 | | 137.5 | 1.8 | 4.4 | 67.3 | 26.5 |
| PP-23 | 21,775 | 32,897 | 1.51 | | 137.7 | 3.2 | 8.0 | 64.0 | 24.8 |
| PP-24 | 12,960 | 26,637 | 2.06 | | 136.1 | 0.0 | 6.7 | 64.0 | 29.3 |
| PP-25 | 13,465 | 26,822 | 1.99 | | 136.8 | 2.8 | 6.8 | 63.8 | 26.6 |
| PP-26 | 4,143 | 6,698 | 1.62 | | 123.3 | 1.1 | 11.7 | 70.0 | 17.2 |

TABLE 1-continued

Propylene polymerization & Ethylene-propylene copolymerization examples.

| | | | | | | | | | |
|---|---|---|---|---|---|---|---|---|---|
| PP-27 | 3,947 | 6,552 | 1.66 | | 122.8 | 1.1 | 4.3 | 71.2 | 23.4 |
| EP-20 | 20,710 | 32,957 | 1.59 | 3.0 | | 1.4 | 5.8 | 65.5 | 27.3 |
| EP-21 | 21,367 | 33,415 | 1.56 | 6.1 | 92.1 | 1.4 | 2.8 | 66.0 | 29.8 |
| EP-22 | 18,690 | 30,217 | 1.62 | 8.7 | 84.5 | 2.5 | 1.2 | 66.0 | 30.2 |
| EP-23 | 17,875 | 29,992 | 1.68 | 8.9 | 84.8 | 0.6 | 3.0 | 65.1 | 31.3 |
| EP-24 | 24,261 | 40,211 | 1.66 | 13.7 | 84.2 | 1.4 | 3.6 | 63.8 | 31.2 |
| EP-25 | 22,976 | 38,365 | 1.67 | 12.8 | | 2.1 | 4.1 | 62.8 | 31.0 |
| EP-26 | 26,727 | 51,710 | 1.93 | 12.9 | | 4.9 | 13.0 | 50.4 | 31.7 |
| EP-27 | 20,556 | 41,140 | 2.00 | 15.8 | | 3.5 | 11.1 | 57.6 | 27.8 |
| EP-28 | 6,548 | 12,395 | 1.89 | 19.3 | | 0.5 | 2.2 | 69.5 | 27.7 |
| EP-29 | 6,251 | 11,881 | 1.90 | 19.2 | | 0.5 | 1.8 | 69.6 | 28.1 |
| EP-30 | 21,929 | 39,968 | 1.82 | 21.0 | | 0.9 | 4.6 | 62.0 | 32.4 |
| EP-31 | 18,133 | 35,440 | 1.95 | 20.3 | 118.7 | 0.0 | 0.8 | 64.1 | 35.2 |
| EP-32 | 22,011 | 49,009 | 2.23 | 18.9 | | 3.0 | 9.8 | 57.1 | 30.1 |
| EP-33 | 15,005 | 38,214 | 2.55 | 18.9 | | 3.6 | 19.8 | 55.3 | 21.3 |
| EP-34 | 6,499 | 13,213 | 2.03 | 25.0 | | 1.5 | 6.1 | 67.6 | 24.7 |
| EP-35 | 6,333 | 13,207 | 2.09 | 24.6 | | 0.0 | 0.5 | 70.8 | 28.6 |
| EP-36 | 16,660 | 48,598 | 2.92 | 25.7 | 137.9 | 0.0 | 1.7 | 65.0 | 33.3 |
| EP-37 | 16,087 | 39,315 | 2.44 | 26.9 | | 0.0 | 3.9 | 64.1 | 32.0 |
| PP-28 | 31,451 | 54,060 | 1.72 | | 139.5 | 1.4 | 5.6 | 80.6 | 12.5 |
| PP-29 | 28,047 | 48,549 | 1.73 | | 138.2 | 0.0 | 0.0 | 88.0 | 12.0 |
| PP-30 | 5,681 | 9,837 | 1.73 | | 124.7 | 0.7 | 2.7 | 89.6 | 7.0 |
| PP-31 | 5,323 | 9,264 | 1.74 | | 125.4 | 1.3 | 3.7 | 87.1 | 7.9 |
| EP-38 | 28,030 | 62,608 | 2.23 | 17.2 | | 3.6 | 7.1 | 75.0 | 14.3 |
| EP-39 | 34,179 | 71,414 | 2.09 | 18.2 | | 3.3 | 18.7 | 69.2 | 8.8 |
| EP-40 | 11,078 | 21,485 | 1.94 | 22.1 | | 1.8 | 3.1 | 85.1 | 10.1 |
| EP-41 | 8,349 | 16,728 | 2.00 | 20.3 | | 1.3 | 2.5 | 88.6 | 7.6 |
| EP-42 | 22,419 | 59,214 | 2.64 | 19.0 | | 3.0 | 11.2 | 71.6 | 14.2 |
| EP-43 | 11,508 | 24,271 | 2.11 | 27.8 | | 2.6 | 7.0 | 80.9 | 9.6 |
| EP-44 | 12,324 | 24,099 | 1.96 | 27.8 | | 1.7 | 6.7 | 82.1 | 9.6 |
| PP-32 | 47,429 | 82,418 | 1.74 | | 151.5 | 0.0 | 13.0 | 75.9 | 11.1 |
| PP-33 | 42,074 | 78,314 | 1.86 | | 150.7 | 7.6 | 21.5 | 62.0 | 8.9 |
| EP-45 | 17,652 | 56,954 | 3.23 | 8.8 | 100.3 | 2.0 | 4.7 | 78.7 | 14.7 |
| EP-46 | 16,256 | 54,287 | 3.34 | 8.3 | 104.5 | 0.0 | 0.0 | 86.9 | 13.1 |
| EP-47 | 16,632 | 61,724 | 3.71 | 11.4 | 91.3 | 2.5 | 5.7 | 77.2 | 14.6 |
| EP-48 | 16,261 | 63,177 | 3.89 | 12.8 | 90.0 | 2.5 | 5.5 | 79.1 | 12.9 |
| EP-49 | 15,300 | 65,806 | 4.30 | 16.1 | | 2.3 | 5.7 | 78.2 | 13.8 |
| EP-50 | 14,261 | 70,657 | 4.95 | 15.3 | | 2.6 | 7.2 | 76.3 | 13.9 |
| EP-51 | 13,162 | 82,508 | 6.27 | 21.0 | | 1.5 | 7.8 | 77.9 | 12.7 |
| EP-52 | 13,629 | 87,474 | 6.42 | 19.8 | | 1.9 | 6.1 | 77.8 | 14.2 |
| EP-53 | 12,831 | 98,154 | 7.65 | 25.2 | | 1.7 | 7.3 | 73.2 | 17.9 |
| EP-54 | 13,417 | 97,515 | 7.27 | 24.4 | | 1.4 | 4.5 | 79.1 | 15.0 |
| CPP-1 | 25,220 | 53,948 | 2.14 | | 138.7 | 3.3 | 4.4 | 37.8 | 54.4 |
| CPP-2 | 28,677 | 44,260 | 1.54 | | 138.4 | 5.3 | 7.4 | 38.9 | 48.4 |
| CEP-1 | 32,880 | 52,880 | 1.61 | 3.6 | 105.8 | 2.4 | 1.2 | 40.0 | 56.5 |
| CEP-2 | 28,858 | 47,365 | 1.64 | 8.0 | 100.2 | 1.0 | 3.1 | 39.8 | 56.1 |
| CEP-3 | 34,383 | 54,039 | 1.57 | 9.5 | 88.9 | 0.0 | 4.7 | 38.8 | 56.5 |
| CEP-4 | 30,928 | 52,200 | 1.69 | 9.7 | 89.5 | 2.1 | 3.2 | 37.9 | 56.8 |
| CEP-5 | 36,261 | 60,943 | 1.68 | 13.4 | | 3.3 | 4.4 | 36.7 | 55.6 |
| CEP-6 | 35,037 | 58,905 | 1.68 | 13.6 | | 4.3 | 3.3 | 35.9 | 56.5 |
| CEP-7 | 30,348 | 53,280 | 1.76 | 20.7 | 112.7 | 3.2 | 11.7 | 35.1 | 50.0 |
| CEP-8 | 30,461 | 236,939 | 7.78 | 28.7 | 111.2 | 1.9 | 4.8 | 39.0 | 54.3 |
| CEP-9 | 29,857 | 55,730 | 1.87 | 27.4 | 115.7 | 1.2 | 4.9 | 35.4 | 58.5 |
| CEP-10 | 23,616 | 116,202 | 4.92 | 23.1 | 115.7 | 1.1 | 4.4 | 37.8 | 56.7 |
| CPP-3 | 27,587 | 40,180 | 1.46 | | 138.9 | 3.6 | 5.5 | 52.7 | 38.2 |
| CPP-4 | 34,671 | 48,766 | 1.41 | | 140.9 | 2.7 | 19.5 | 31.9 | 46.0 |
| CEP-11 | 29,431 | 45,421 | 1.54 | 6.8 | 97.3 | 1.3 | 2.5 | 38.8 | 57.5 |
| CEP-12 | 25,567 | 41,455 | 1.62 | 9.5 | 93.7 | 0.0 | 2.3 | 40.2 | 57.5 |
| CEP-13 | 26,490 | 42,679 | 1.61 | 10.3 | | 2.2 | 2.2 | 38.7 | 57.0 |
| CEP-14 | 23,326 | 38,249 | 1.64 | 8.4 | | 0.9 | 0.0 | 44.0 | 55.0 |
| CEP-15 | 32,878 | 53,423 | 1.62 | 14.1 | | 0.0 | 0.0 | 39.7 | 60.3 |
| CEP-16 | 27,356 | 47,093 | 1.72 | 15.2 | | 1.1 | 2.3 | 40.9 | 55.7 |
| CEP-17 | 29,236 | 52,558 | 1.80 | 18.0 | | 0.0 | 2.4 | 40.5 | 57.1 |
| CEP-18 | 27,041 | 49,550 | 1.83 | 15.3 | | 1.1 | 3.2 | 41.1 | 54.7 |
| CEP-19 | 21,704 | 48,769 | 2.25 | 20.5 | | 0.8 | 4.2 | 45.0 | 50.0 |
| CEP-20 | 22,483 | 47,343 | 2.11 | 22.0 | | 0.0 | 1.8 | 55.8 | 42.5 |
| CPP-5 | 3,643 | 5,514 | 1.51 | | * | 0.5 | 1.7 | 41.5 | 56.3 |
| CPP-6 | 3,571 | 5,343 | 1.50 | | * | 0.5 | 1.8 | 41.8 | 56.0 |
| CEP-21 | 5,418 | 9,627 | 1.78 | 23.6 | | 0.6 | 4.6 | 32.5 | 62.3 |
| CEP-22 | 5,502 | 9,939 | 1.81 | 20.4 | | 1.0 | 5.0 | 34.3 | 59.8 |
| CEP-23 | 7,184 | 13,035 | 1.81 | 25.6 | | 0.0 | 2.5 | 36.0 | 61.5 |
| CEP-24 | 6,673 | 12,081 | 1.81 | 24.2 | | 0.0 | 3.7 | 37.3 | 59.0 |
| CEP-25 | 13,406 | 22,369 | 1.67 | 41.9 | | 0.0 | 3.9 | 39.0 | 57.1 |
| CEP-26 | 13,109 | 21,678 | 1.65 | 45.0 | | 0.4 | 6.1 | 38.2 | 55.3 |
| CEP-27 | 21,359 | 32,888 | 1.54 | 53.5 | | 0.0 | 8.9 | 37.0 | 54.1 |
| CEP-28 | 20,742 | 34,206 | 1.65 | 46.6 | | 0.0 | 9.5 | 38.1 | 52.4 |
| CEP-29 | 25,915 | 41,693 | 1.61 | 55.2 | | 0.9 | 8.5 | 36.8 | 53.8 |
| CEP-30 | 26,539 | 41,978 | 1.58 | 54.9 | | 0.0 | 7.6 | 38.1 | 54.3 |

TABLE 1-continued

Propylene polymerization & Ethylene-propylene copolymerization examples.

| | | | | | | | | | |
|---|---|---|---|---|---|---|---|---|---|
| CPP-7 | 89,641 | 147,267 | 1.64 | | 141.8 | 6.7 | 20.0 | 20.0 | 53.3 |
| CPP-8 | 90,190 | 147,358 | 1.63 | | 142.0 | 5.6 | 24.1 | 24.1 | 46.3 |
| CEP-31 | 109,130 | 182,358 | 1.67 | 8.1 | | 0.0 | 5.0 | 10.0 | 85.0 |
| CEP-32 | 59,009 | 113,096 | 1.92 | 6.3 | 95.7 | 2.1 | 0.0 | 10.6 | 87.2 |
| CEP-33 | 117,536 | 197,873 | 1.68 | 13.2 | | 4.4 | 0.0 | 8.9 | 86.7 |
| CEP-34 | 143,952 | 238,408 | 1.66 | 14.9 | | 4.1 | 14.3 | 12.2 | 69.4 |
| CEP-35 | 60,933 | 122,443 | 2.01 | 17.4 | | 0.0 | 8.0 | 20.0 | 72.0 |
| CEP-36 | 48,758 | 110,165 | 2.26 | 15.8 | | 5.6 | 4.2 | 16.7 | 73.6 |
| CEP-37 | 129,035 | 218,743 | 1.70 | 19.6 | | 4.2 | 4.2 | 10.4 | 81.3 |
| CEP-38 | 31,549 | 98,597 | 3.13 | 16.8 | | 1.1 | 0.0 | 22.0 | 76.9 |
| CEP-39 | 67,240 | 153,942 | 2.29 | 27.5 | | 3.3 | 8.3 | 16.7 | 71.7 |
| CEP-40 | 35,389 | 115,893 | 3.27 | 24.5 | | 2.2 | 6.7 | 23.3 | 67.8 |
| CPP-9 | 47,237 | 100,374 | 2.12 | | 148.4 | | | | |
| CPP-10 | 63,174 | 137,415 | 2.18 | | 153.5 | 5.2 | 37.1 | 37.1 | 20.6 |
| CPP-11 | 58,584 | 129,890 | 2.22 | | 152.9 | | | | |
| CPP-12 | 48,120 | 109,203 | 2.27 | | 150.7 | 5.4 | 29.8 | 35.1 | 29.8 |
| CEP-41 | 24,197 | 64,519 | 2.67 | 14.72 | 67.1 | | | | |
| CEP-42 | 26,709 | 67,617 | 2.53 | 14.94 | 76.4 | 0.0 | 8.3 | 31.0 | 60.7 |
| CEP-43 | 23,274 | 66,644 | 2.86 | 14.04 | 77.5 | | | | |
| CEP-44 | 21,988 | 57,691 | 2.62 | 12.47 | 106.0 | 3.9 | 18.2 | 35.4 | 42.5 |
| CEP-45 | 20,590 | 64,503 | 3.13 | 23.61 | 96.3 | | | | |
| CEP-46 | 21,840 | 62,130 | 2.84 | 23.16 | 128.5 | 0.5 | 4.3 | 36.2 | 59.0 |
| CEP-47 | 46,028 | 79,578 | 1.73 | 20.37 | 67.1 | | | | |
| CEP-48 | 33,243 | 72,847 | 2.19 | 27.47 | 72.7 | 2.0 | 4.6 | 28.9 | 64.5 |
| CPP-13 | 2,370 | 3,132 | 1.32 | | * | 0.4 | 3.1 | 82.2 | 14.2 |
| CPP-14 | 2,484 | 3,346 | 1.35 | | * | 0.4 | 3.3 | 82.1 | 14.2 |
| CEP-49 | 3,636 | 5,510 | 1.52 | 9.7 | | 0.3 | 2.2 | 79.4 | 18.2 |
| CEP-50 | 3,439 | 5,197 | 1.51 | 12.0 | | 0.4 | 2.8 | 79.1 | 17.7 |
| CEP-51 | 3,391 | 5,593 | 1.65 | 12.3 | | 0.6 | 3.1 | 79.3 | 17.0 |
| CEP-52 | 4,024 | 6,458 | 1.60 | 18.0 | | 0.6 | 3.0 | 77.9 | 18.5 |
| CEP-53 | 3,750 | 7,198 | 1.92 | 26.2 | | 0.5 | 3.1 | 79.2 | 17.2 |
| CEP-54 | 3,780 | 7,637 | 2.02 | 23.1 | | 3.2 | 12.9 | 25.8 | 58.1 |
| CEP-55 | 4,870 | 10,844 | 2.23 | 32.6 | | 0.3 | 3.4 | 78.2 | 18.0 |
| CEP-56 | 3,978 | 9,805 | 2.46 | 34.0 | | 0.4 | 3.5 | 80.3 | 15.8 |
| CEP-57 | 4,585 | 12,093 | 2.64 | 41.7 | | 0.4 | 3.7 | 80.4 | 15.6 |
| CEP-58 | 4,170 | 11,438 | 2.74 | 38.9 | | 0.6 | 3.9 | 80.0 | 15.5 |
| CPP-15 | 79119 | 127,194 | 1.61 | 0.0 | 131.9 | 11.2 | 35.5 | 27.1 | 26.2 |
| CPP-16 | 95396 | 159,909 | 1.68 | 0.0 | 132.4 | 10.2 | 38.7 | 23.4 | 27.7 |
| CEP-59 | 70215 | 121,316 | 1.73 | 11.5 | | 5.2 | 8.6 | 15.5 | 70.7 |
| CEP-60 | 54250 | 106,170 | 1.96 | 8.1 | | 10.9 | 38.3 | 22.9 | 27.9 |
| CEP-61 | 59336 | 111,783 | 1.88 | 13.3 | | 3.9 | 44.8 | 26.6 | 24.7 |
| CEP-62 | 51925 | 104,164 | 2.01 | 13.7 | | 7.9 | 36.7 | 23.7 | 31.7 |
| CEP-63 | 97237 | 160,132 | 1.65 | 19.0 | | 5.5 | 30.9 | 16.4 | 47.3 |
| CEP-64 | 59697 | 120,679 | 2.02 | 14.0 | | 8.7 | 33.7 | 22.1 | 35.6 |
| CEP-65 | 67534 | 124,730 | 1.85 | 22.5 | | 6.8 | 13.7 | 16.4 | 63.0 |
| CEP-66 | 97677 | 169,756 | 1.74 | 26.3 | | 3.4 | 28.8 | 16.9 | 50.8 |
| CEP-67 | 86449 | 154,485 | 1.79 | 30.6 | | 3.4 | 18.6 | 16.9 | 61.0 |
| CEP-68 | 45696 | 117,956 | 2.58 | 24.4 | | 7.1 | 25.3 | 24.2 | 43.4 |

*Polypropylene produced exhibited no melting peak (non-crystalline)

TABLE 2

Propylene polymerization examples

| Ex# | Cat ID | Act ID | Catalyst (umol) | Iso-hexane (uL) | Toluene (uL) | T (C.) | Quench value (psi) | quench time (s) | yield (g) | Activity (g P/mmol cat · hr) | Mn | Mw | PDI | Tm (° C.) |
|---|---|---|---|---|---|---|---|---|---|---|---|---|---|---|
| PP-34 | 2 | B | 0.040 | 3832 | 268 | 70 | 15 | 26 | 0.3011 | 1,050,349 | 5,856 | 20,187 | 3.45 | 138.5 |
| PP-35 | 2 | B | 0.040 | 3832 | 268 | 70 | 15 | 31 | 0.3400 | 977,636 | 5,239 | 17,503 | 3.34 | 136.9 |
| PP-36 | 2 | B | 0.040 | 3832 | 268 | 70 | 15 | 29 | 0.3622 | 1,135,819 | 4,819 | 14,888 | 3.09 | 135.4 |
| PP-37 | 2 | B | 0.040 | 3832 | 268 | 70 | 15 | 21 | 0.2954 | 1,290,583 | 6,856 | 23,457 | 3.42 | 138.9 |
| PP-38 | 2 | B | 0.040 | 3832 | 268 | 70 | 15 | 28 | 0.2871 | 913,039 | 7,313 | 26,069 | 3.56 | 140.4 |
| PP-39 | 2 | B | 0.040 | 3832 | 268 | 70 | 15 | 28 | 0.2700 | 870,968 | 6,707 | 27,166 | 4.05 | 139.0 |
| PP-40 | 2 | B | 0.040 | 3832 | 268 | 100 | 15 | 19 | 0.2644 | 1,245,864 | 3,563 | 6,500 | 1.82 | 130.1 |
| PP-41 | 2 | B | 0.040 | 3832 | 268 | 100 | 15 | 19 | 0.2565 | 1,221,429 | 3,821 | 7,304 | 1.91 | 132.6 |
| PP-42 | 2 | B | 0.040 | 3832 | 268 | 100 | 15 | 19 | 0.2544 | 1,224,385 | 3,317 | 5,839 | 1.76 | 130.8 |
| PP-43 | 2 | B | 0.040 | 3832 | 268 | 100 | 15 | 23 | 0.2624 | 1,022,338 | 3,509 | 6,987 | 1.99 | 132.6 |
| PP-44 | 2 | B | 0.040 | 3832 | 268 | 100 | 15 | 31 | 0.2190 | 642,020 | 3,654 | 6,859 | 1.88 | 133.8 |
| PP-45 | 2 | B | 0.040 | 3832 | 268 | 100 | 15 | 25 | 0.2398 | 863,280 | 3,781 | 7,333 | 1.94 | 134.2 |
| PP-46 | 7 | A | 0.050 | 0 | 4099 | 70 | 8 | 835 | 0.0617 | 5,321 | 50,959 | 76,581 | 1.50 | 149.5 |
| PP-47 | 7 | A | 0.050 | 0 | 4099 | 70 | 8 | 892 | 0.0612 | 4,941 | 52,441 | 79,829 | 1.52 | 149.9 |
| PP-48 | 7 | A | 0.050 | 0 | 4099 | 70 | 8 | 944 | 0.065 | 4,959 | 56,232 | 84,346 | 1.50 | 150.0 |
| PP-49 | 7 | A | 0.050 | 0 | 4099 | 100 | 8 | 574 | 0.0544 | 6,821 | 13,376 | 20,509 | 1.53 | 141.6 |
| PP-50 | 7 | A | 0.050 | 0 | 4099 | 100 | 8 | 591 | 0.0525 | 6,400 | 12,253 | 19,016 | 1.55 | 141.2 |

TABLE 2-continued

Propylene polymerization examples

| Ex# | Cat ID | Act ID | Catalyst (umol) | Iso-hexane (uL) | Toluene (uL) | T (C.) | Quench value (psi) | quench time (s) | yield (g) | Activity (g P/mmol cat · hr) | Mn | Mw | PDI | Tm (° C.) |
|---|---|---|---|---|---|---|---|---|---|---|---|---|---|---|
| PP-51 | 7 | A | 0.050 | 0 | 4099 | 100 | 8 | 692 | 0.052 | 5,408 | 11,035 | 17,207 | 1.56 | 140.3 |
| PP-52 | 8 | A | 0.025 | 0 | 4099 | 70 | 8 | 1801 | 0.0408 | 3,263 | 71,643 | 106,093 | 1.48 | 149.7 |
| PP-53 | 8 | A | 0.025 | 0 | 4099 | 70 | 8 | 1801 | 0.0409 | 3,271 | 83,262 | 124,778 | 1.50 | 150.5 |
| PP-54 | 8 | A | 0.025 | 0 | 4099 | 70 | 8 | 1801 | 0.0379 | 3,031 | 77,423 | 120,414 | 1.56 | 150.0 |
| PP-55 | 8 | A | 0.025 | 0 | 4099 | 100 | 8 | 1800 | 0.0233 | 1,864 | 22,912 | 33,633 | 1.47 | 143.9 |
| PP-56 | 8 | A | 0.025 | 0 | 4099 | 100 | 8 | 1801 | 0.0329 | 2,631 | 23,497 | 34,715 | 1.48 | 143.4 |
| PP-57 | 8 | A | 0.025 | 0 | 4099 | 100 | 8 | 1801 | 0.0341 | 2,727 | 24,694 | 36,270 | 1.47 | 143.4 |
| PP-58 | 8 | A | 0.040 | 0 | 4099 | 70 | 8 | 1121 | 0.0513 | 4,117 | 55,638 | 87,066 | 1.56 | 150.7 |
| PP-59 | 8 | A | 0.040 | 0 | 4099 | 70 | 8 | 1396 | 0.0533 | 3,436 | 42,485 | 67,921 | 1.60 | 150.0 |
| PP-60 | 8 | A | 0.040 | 0 | 4099 | 70 | 8 | 1366 | 0.0582 | 3,835 | 56,639 | 90,914 | 1.61 | 150.5 |
| PP-61 | 8 | A | 0.040 | 0 | 4099 | 100 | 8 | 1067 | 0.0538 | 4,539 | 16,990 | 25,991 | 1.53 | 143.8 |
| PP-62 | 8 | A | 0.040 | 0 | 4099 | 100 | 8 | 968 | 0.0532 | 4,947 | 17,327 | 26,356 | 1.52 | 144.0 |
| PP-63 | 8 | A | 0.040 | 0 | 4099 | 100 | 8 | 1026 | 0.0548 | 4,808 | 16,488 | 25,228 | 1.53 | 144.4 |
| PP-64 | 9 | A | 0.080 | 0 | 4098 | 70 | 8 | 552 | 0.0651 | 5,308 | 51,514 | 81,114 | 1.57 | 148.9 |
| PP-65 | 9 | A | 0.080 | 0 | 4098 | 70 | 8 | 523 | 0.0586 | 5,038 | 59,629 | 94,591 | 1.59 | 149.4 |
| PP-66 | 9 | A | 0.080 | 0 | 4098 | 70 | 8 | 664 | 0.0711 | 4,821 | 58,135 | 91,911 | 1.58 | 149.5 |
| PP-67 | 9 | A | 0.080 | 0 | 4098 | 100 | 8 | 427 | 0.062 | 6,537 | 14,137 | 21,965 | 1.55 | 140.1 |
| PP-68 | 9 | A | 0.080 | 0 | 4098 | 100 | 8 | 393 | 0.0645 | 7,389 | 13,714 | 21,792 | 1.59 | 140.6 |
| PP-69 | 9 | A | 0.080 | 0 | 4098 | 100 | 8 | 431 | 0.0592 | 6,181 | 13,623 | 21,521 | 1.58 | 141.5 |
| PP-70 | 10 | A | 0.080 | 0 | 4098 | 70 | 8 | 1802 | 0.0242 | 604 | 24,604 | 36,518 | 1.48 | |
| PP-71 | 10 | A | 0.080 | 0 | 4098 | 70 | 8 | 1800 | 0.0219 | 547 | 24,181 | 35,607 | 1.47 | |
| PP-72 | 10 | A | 0.080 | 0 | 4098 | 70 | 8 | 1803 | 0.0232 | 579 | 24,870 | 36,781 | 1.48 | |
| PP-73 | 10 | A | 0.080 | 0 | 4098 | 100 | 8 | 1803 | 0.0238 | 594 | 7,222 | 11,004 | 1.52 | |
| PP-74 | 10 | A | 0.080 | 0 | 4098 | 100 | 8 | 1800 | 0.0216 | 540 | 6,821 | 10,182 | 1.49 | |
| PP-75 | 10 | A | 0.080 | 0 | 4098 | 100 | 8 | 1803 | 0.0232 | 579 | 7,145 | 10,737 | 1.50 | |
| PP-76 | 11 | A | 0.080 | 3609 | 489 | 70 | 20 | 1801 | 0.1411 | 3,526 | 50,585 | 76,740 | 1.52 | 139.6 |
| PP-77 | 11 | A | 0.080 | 3609 | 489 | 70 | 20 | 1802 | 0.1241 | 3,099 | 52,762 | 80,621 | 1.53 | 140.4 |
| PP-78 | 11 | A | 0.080 | 3609 | 489 | 70 | 20 | 1801 | 0.1581 | 3,950 | 56,598 | 85,261 | 1.51 | 140.4 |
| PP-79 | 11 | A | 0.080 | 3609 | 489 | 100 | 20 | 1445 | 0.1336 | 4,161 | 7,328 | 12,324 | 1.68 | 124.9 |
| PP-80 | 11 | A | 0.080 | 3609 | 489 | 100 | 20 | 1520 | 0.1338 | 3,960 | 9,000 | 14,460 | 1.61 | 128.4 |
| PP-81 | 11 | A | 0.080 | 3609 | 489 | 100 | 20 | 1458 | 0.1342 | 4,142 | 8,976 | 14,426 | 1.61 | 128.5 |
| PP-82 | 12 | A | 0.080 | 3609 | 489 | 70 | 20 | 1801 | 0.1590 | 3,973 | 55,140 | 83,420 | 1.51 | 140.9 |
| PP-83 | 12 | A | 0.080 | 3609 | 489 | 70 | 20 | 1654 | 0.1747 | 4,754 | 54,728 | 102,854 | 1.88 | 140.8 |
| PP-84 | 12 | A | 0.080 | 3609 | 489 | 70 | 20 | 1773 | 0.1720 | 4,366 | 57,908 | 89,070 | 1.54 | 141.1 |
| PP-85 | 12 | A | 0.080 | 3609 | 489 | 100 | 20 | 1281 | 0.1321 | 4,642 | 10,115 | 17,366 | 1.72 | 129.5 |
| PP-86 | 12 | A | 0.080 | 3609 | 489 | 100 | 20 | 1475 | 0.1335 | 4,072 | 10,701 | 15,303 | 1.43 | 128.3 |
| PP-87 | 12 | A | 0.080 | 3609 | 489 | 100 | 20 | 1522 | 0.1299 | 3,842 | 11,272 | 15,855 | 1.41 | 129.9 |
| PP-88 | 12 | B | 0.080 | 3720 | 380 | 70 | 20 | 41 | 0.3537 | 385,387 | 6,887 | 19,001 | 2.76 | 129.9 |
| PP-89 | 12 | B | 0.080 | 3720 | 380 | 70 | 20 | 43 | 0.3610 | 377,791 | 5,993 | 16,559 | 2.76 | 130.2 |
| PP-90 | 12 | B | 0.080 | 3720 | 380 | 70 | 20 | 39 | 0.3489 | 403,612 | 6,689 | 17,935 | 2.68 | 130.4 |
| PP-91 | 12 | B | 0.080 | 3720 | 380 | 100 | 20 | 34 | 0.2827 | 376,376 | 3,461 | 5,361 | 1.55 | 119.0 |
| PP-92 | 12 | B | 0.080 | 3720 | 380 | 100 | 20 | 33 | 0.2885 | 395,808 | 3,411 | 5,254 | 1.54 | 117.6 |
| PP-93 | 12 | B | 0.080 | 3720 | 380 | 100 | 20 | 25 | 0.2913 | 516,083 | 3,776 | 6,124 | 1.62 | 119.3 |
| PP-94 | 13 | A | 0.080 | 3609 | 489 | 70 | 20 | 1800 | 0.1312 | 3,279 | 36,426 | 54,657 | 1.50 | 138.9 |
| PP-95 | 13 | A | 0.080 | 3609 | 489 | 70 | 20 | 1801 | 0.1291 | 3,225 | 41,306 | 62,787 | 1.52 | 139.7 |
| PP-96 | 13 | A | 0.080 | 3609 | 489 | 70 | 20 | 1801 | 0.1336 | 3,338 | 39,208 | 58,188 | 1.48 | 139.3 |
| PP-97 | 13 | A | 0.080 | 3609 | 489 | 100 | 20 | 1802 | 0.1295 | 3,234 | 6,917 | 10,918 | 1.58 | 126.0 |
| PP-98 | 13 | A | 0.080 | 3609 | 489 | 100 | 20 | 1802 | 0.1341 | 3,348 | 7,006 | 11,116 | 1.59 | 126.2 |
| PP-99 | 13 | A | 0.080 | 3609 | 489 | 100 | 20 | 1800 | 0.1272 | 3,180 | 5,808 | 9,189 | 1.58 | 121.9 |
| PP-100 | 14 | A | 0.080 | 3609 | 489 | 70 | 20 | 1802 | 0.1510 | 3,771 | 39,412 | 56,896 | 1.44 | 139.7 |
| PP-101 | 14 | A | 0.080 | 3609 | 489 | 70 | 20 | 1801 | 0.1410 | 3,523 | 33,934 | 66,447 | 1.96 | 139.8 |
| PP-102 | 14 | A | 0.080 | 3609 | 489 | 70 | 20 | 1800 | 0.1457 | 3,642 | 38,471 | 58,638 | 1.52 | 140.5 |
| PP-103 | 14 | A | 0.080 | 3609 | 489 | 100 | 20 | 1473 | 0.1306 | 3,991 | 8,266 | 11,895 | 1.44 | 128.5 |
| PP-104 | 14 | A | 0.080 | 3609 | 489 | 100 | 20 | 1489 | 0.1344 | 4,062 | 8,521 | 11,812 | 1.39 | 127.8 |
| PP-105 | 14 | A | 0.080 | 3609 | 489 | 100 | 20 | 1522 | 0.1299 | 3,840 | 7,257 | 11,284 | 1.55 | 127.0 |
| PP-106 | 14 | B | 0.080 | 3720 | 380 | 70 | 20 | 49 | 0.3424 | 315,738 | 6,577 | 15,820 | 2.41 | 130.4 |
| PP-107 | 14 | B | 0.080 | 3720 | 380 | 70 | 20 | 46 | 0.3445 | 334,106 | 7,045 | 17,506 | 2.48 | 130.1 |
| PP-108 | 14 | B | 0.080 | 3720 | 380 | 70 | 20 | 45 | 0.3417 | 338,689 | 7,452 | 18,124 | 2.43 | 130.8 |
| PP-109 | 14 | B | 0.080 | 3720 | 380 | 100 | 20 | 33 | 0.2777 | 382,156 | 3,416 | 5,071 | 1.48 | 120.4 |
| PP-110 | 14 | B | 0.080 | 3720 | 380 | 100 | 20 | 38 | 0.2740 | 321,932 | 3,104 | 4,424 | 1.43 | 117.5 |
| PP-111 | 14 | B | 0.080 | 3720 | 380 | 100 | 20 | 30 | 0.2807 | 418,262 | 3,351 | 4,867 | 1.45 | 118.0 |
| PP-112 | 15 | A | 0.025 | 0 | 4099 | 70 | 8 | 406 | 0.0826 | 29,289 | 105,329 | 144,351 | 1.37 | 151.7 |
| PP-113 | 15 | A | 0.025 | 0 | 4099 | 70 | 8 | 366 | 0.0953 | 37,485 | 95,651 | 135,662 | 1.42 | 151.7 |
| PP-114 | 15 | A | 0.025 | 0 | 4099 | 70 | 8 | 389 | 0.0835 | 30,934 | 104,351 | 143,392 | 1.37 | 151.7 |
| PP-115 | 15 | A | 0.025 | 0 | 4099 | 100 | 8 | 613 | 0.056 | 13,165 | 18,362 | 25,732 | 1.40 | 145.9 |
| PP-116 | 15 | A | 0.025 | 0 | 4099 | 100 | 8 | 261 | 0.0756 | 41,647 | 18,791 | 25,940 | 1.38 | 143.6 |
| PP-117 | 15 | A | 0.025 | 0 | 4099 | 100 | 8 | 249 | 0.0782 | 45,206 | 17,827 | 25,938 | 1.45 | 144.7 |
| PP-118 | 16 | A | 0.025 | 0 | 4099 | 70 | 8 | 610 | 0.0606 | 14,313 | 105,751 | 158,433 | 1.50 | 151.4 |
| PP-119 | 16 | A | 0.025 | 0 | 4099 | 70 | 8 | 658 | 0.0641 | 14,026 | 122,794 | 174,176 | 1.42 | 152.3 |
| PP-120 | 16 | A | 0.025 | 0 | 4099 | 70 | 8 | 559 | 0.0615 | 15,843 | 123,532 | 173,849 | 1.41 | 152.3 |
| PP-120 | 16 | A | 0.025 | 0 | 4099 | 100 | 8 | 349 | 0.0612 | 25,259 | 21,182 | 30,514 | 1.44 | 144.8 |
| PP-122 | 16 | A | 0.025 | 0 | 4099 | 100 | 8 | 264 | 0.0583 | 31,860 | 20,286 | 29,401 | 1.45 | 144.3 |
| PP-123 | 16 | A | 0.025 | 0 | 4099 | 100 | 8 | 343 | 0.0616 | 25,899 | 18,540 | 29,074 | 1.57 | 144.5 |
| PP-124 | 16 | A | 0.060 | 0 | 4099 | 70 | 8 | 115 | 0.1654 | 86,146 | 60,601 | 98,968 | 1.63 | 149.5 |

TABLE 2-continued

Propylene polymerization examples

| Ex# | Cat ID | Act ID | Catalyst (umol) | Iso-hexane (uL) | Toluene (uL) | T (C.) | Quench value (psi) | quench time (s) | yield (g) | Activity (g P/mmol cat · hr) | Mn | Mw | PDI | Tm (° C.) |
|---|---|---|---|---|---|---|---|---|---|---|---|---|---|---|
| PP-125 | 16 | A | 0.060 | 0 | 4099 | 70 | 8 | 116 | 0.1599 | 82,707 | 61,400 | 99,289 | 1.62 | 149.7 |
| PP-126 | 16 | A | 0.060 | 0 | 4099 | 70 | 8 | 107 | 0.1428 | 79,851 | 58,934 | 95,808 | 1.63 | 150.5 |
| PP-127 | 16 | A | 0.060 | 0 | 4099 | 100 | 8 | 73 | 0.1311 | 108,198 | 10,899 | 18,738 | 1.72 | 141.2 |
| PP-128 | 16 | A | 0.060 | 0 | 4099 | 100 | 8 | 73 | 0.1247 | 103,200 | 10,859 | 18,741 | 1.73 | 142.2 |
| PP-129 | 16 | A | 0.060 | 0 | 4099 | 100 | 8 | 64 | 0.1258 | 117,387 | 10,612 | 18,319 | 1.73 | 141.7 |
| PP-130 | 16 | B | 0.025 | 3881 | 218 | 70 | 8 | 57 | 0.2885 | 735,292 | 20,485 | 47,051 | 2.30 | 146.4 |
| PP-131 | 16 | B | 0.025 | 3881 | 218 | 70 | 8 | 62 | 0.2963 | 691,527 | 23,036 | 51,949 | 2.26 | 147.1 |
| PP-132 | 16 | B | 0.025 | 3881 | 218 | 70 | 8 | 63 | 0.2903 | 666,718 | 22,124 | 50,697 | 2.29 | 146.7 |
| PP-133 | 16 | B | 0.025 | 3881 | 218 | 100 | 8 | 37 | 0.2203 | 869,129 | 5,074 | 10,086 | 1.99 | 137.4 |
| PP-134 | 16 | B | 0.025 | 3881 | 218 | 100 | 8 | 35 | 0.2226 | 915,840 | 4,576 | 9,635 | 2.11 | 136.2 |
| PP-135 | 16 | B | 0.025 | 3881 | 218 | 100 | 8 | 36 | 0.2239 | 903,126 | 4,742 | 9,410 | 1.98 | 137.1 |
| PP-136 | 17 | A | 0.050 | 0 | 4099 | 70 | 8 | 844 | 0.0546 | 4,657 | 52,659 | 76,413 | 1.45 | 151.1 |
| PP-137 | 17 | A | 0.050 | 0 | 4099 | 70 | 8 | 1012 | 0.0627 | 4,460 | 60,653 | 86,614 | 1.43 | 150.1 |
| PP-138 | 17 | A | 0.050 | 0 | 4099 | 70 | 8 | 940 | 0.0547 | 4,192 | 65,487 | 92,107 | 1.41 | 151.9 |
| PP-139 | 17 | A | 0.050 | 0 | 4099 | 100 | 8 | 935 | 0.0518 | 3,991 | 10,812 | 15,855 | 1.47 | 141.0 |
| PP-140 | 17 | A | 0.050 | 0 | 4099 | 100 | 8 | 954 | 0.0523 | 3,948 | 10,294 | 15,546 | 1.51 | 140.5 |
| PP-141 | 17 | A | 0.050 | 0 | 4099 | 100 | 8 | 991 | 0.0515 | 3,742 | 10,167 | 15,047 | 1.48 | 140.5 |
| PP-142 | 18 | A | 0.040 | 0 | 4099 | 70 | 8 | 1177 | 0.0686 | 5,246 | 63,766 | 93,574 | 1.47 | 151.0 |
| PP-143 | 18 | A | 0.040 | 0 | 4099 | 70 | 8 | 1013 | 0.0567 | 5,036 | 58,765 | 86,242 | 1.47 | 151.3 |
| PP-144 | 18 | A | 0.040 | 0 | 4099 | 70 | 8 | 1232 | 0.0531 | 3,879 | 61,768 | 90,088 | 1.46 | 151.3 |
| PP-145 | 18 | A | 0.040 | 0 | 4099 | 100 | 8 | 718 | 0.056 | 7,015 | 13,883 | 21,142 | 1.52 | 141.5 |
| PP-146 | 18 | A | 0.040 | 0 | 4099 | 100 | 8 | 701 | 0.0508 | 6,526 | 13,814 | 20,698 | 1.50 | 142.2 |
| PP-147 | 18 | A | 0.040 | 0 | 4099 | 100 | 8 | 760 | 0.0521 | 6,169 | 13,427 | 20,250 | 1.51 | 142.6 |
| PP-148 | 18 | A | 0.050 | 0 | 4099 | 70 | 8 | 604 | 0.068 | 8,102 | 57,334 | 84,281 | 1.47 | 151.4 |
| PP-149 | 18 | A | 0.050 | 0 | 4099 | 100 | 8 | 443 | 0.0652 | 10,592 | 14,456 | 21,744 | 1.50 | 141.3 |
| PP-150 | 18 | A | 0.050 | 0 | 4099 | 100 | 8 | 475 | 0.0622 | 9,428 | 13,889 | 20,847 | 1.50 | 142.2 |
| PP-151 | 18 | A | 0.050 | 0 | 4099 | 100 | 8 | 464 | 0.0644 | 10,000 | 13,614 | 20,798 | 1.53 | 141.7 |
| PP-152 | 18* | B | 0.030 | 3874 | 226 | 70 | 8 | 1800 | 0.0091 | 607 | na | na | na | na |
| PP-153 | 18* | B | 0.030 | 3874 | 226 | 70 | 8 | 1802 | 0.0246 | 1,638 | 98,962 | 174,084 | 1.76 | 151.8 |
| PP-154 | 18* | B | 0.030 | 3874 | 226 | 70 | 8 | 1800 | 0.0119 | 793 | 89,066 | 156,410 | 1.76 | 152.2 |
| CPP-17 | C-G | B | 0.020 | 3890 | 210 | 70 | 20 | 158 | 0.2669 | 303,871 | 89,355 | 130,826 | 1.46 | 153.0 |
| CPP-18 | C-G | C | 0.020 | 3890 | 210 | 70 | 20 | 221 | 0.2052 | 167,056 | 208,101 | 314,564 | 1.51 | 138.1 |
| CPP-19 | C-G | B | 0.020 | 3890 | 210 | 100 | 20 | 131 | 0.1877 | 257,712 | 30,808 | 45,450 | 1.48 | 150.6 |
| CPP-20 | C-G | C | 0.020 | 3890 | 210 | 100 | 20 | 196 | 0.1479 | 136,174 | 60,720 | 92,275 | 1.52 | 117.7 |
| CPP-21 | C-E | B | 0.020 | 3890 | 210 | 70 | 20 | 84 | 0.3463 | 740,309 | 72,499 | 133,715 | 1.84 | 153.7 |
| CPP-22 | C-E | C | 0.020 | 3890 | 210 | 70 | 20 | 101 | 0.3276 | 581,538 | 108,372 | 200,085 | 1.85 | 154.5 |
| CPP-23 | C-E | C | 0.020 | 3890 | 210 | 100 | 20 | 86 | 0.2328 | 486,690 | 47,269 | 74,021 | 1.57 | 147.8 |

"na" indicates that the data was not available

TABLE 3

$^{13}$C NMR data for select polypropylene examples

| Ex# | Cat ID | Act ID | m | r | mmmm | mmmr | rmmr | mmrr | mmrm + rmrr | rmrm |
|---|---|---|---|---|---|---|---|---|---|---|
| PP-34 | 2 | B | 0.974 | 0.026 | 0.9371 | 0.0240 | 0.0000 | 0.0221 | 0.0035 | 0.0000 |
| PP-39 | 2 | B | 0.960 | 0.040 | 0.8430 | 0.0636 | 0.0317 | 0.0271 | 0.0009 | 0.0150 |
| PP-40 | 2 | B | 0.965 | 0.035 | 0.9172 | 0.0327 | 0.0007 | 0.0295 | 0.0000 | 0.0000 |
| PP-44 | 2 | B | 0.922 | 0.078 | 0.7799 | 0.0724 | 0.0311 | 0.0315 | 0.0139 | 0.0309 |
| PP-46-48 | 7 | A | 0.930 | 0.070 | 0.8320 | 0.0312 | 0.0363 | 0.0153 | 0.0341 | 0.0125 |
| PP-49-51 | 7 | A | 0.923 | 0.077 | 0.7939 | 0.0632 | 0.0303 | 0.0216 | 0.0289 | 0.0205 |
| PP-58-60 | 8 | A | 0.969 | 0.031 | 0.9037 | 0.0461 | 0.0107 | 0.0020 | 0.0069 | 0.0085 |
| PP-64-66 | 9 | A | 0.950 | 0.050 | 0.8320 | 0.0738 | 0.0166 | 0.0247 | 0.0181 | 0.0121 |
| PP-67-69 | 9 | A | 0.904 | 0.096 | 0.7479 | 0.0935 | 0.0255 | 0.0425 | 0.0227 | 0.0085 |
| PP-78 | 11 | A | 0.926 | 0.074 | 0.8090 | 0.0666 | 0.0104 | 0.0521 | 0.0158 | 0.0112 |
| PP-79 | 11 | A | 0.942 | 0.057 | 0.8420 | 0.0584 | 0.0096 | 0.0418 | 0.0134 | 0.0096 |
| PP-83 | 12 | A | 0.975 | 0.035 | 0.9203 | 0.0254 | 0.0110 | 0.0271 | 0.0068 | 0.0030 |
| PP-86 | 12 | A | 0.933 | 0.067 | 0.8631 | 0.0292 | 0.0020 | 0.0436 | 0.0239 | 0.0100 |
| PP-89 | 12 | B | 0.929 | 0.072 | 0.8413 | 0.0453 | 0.0034 | 0.0478 | 0.0159 | 0.0134 |
| PP-92 | 12 | B | 0.864 | 0.137 | 0.7165 | 0.0653 | 0.0068 | 0.0706 | 0.0409 | 0.0383 |
| PP-94 | 13 | A | 0.958 | 0.042 | 0.8874 | 0.0420 | 0.0077 | 0.0293 | 0.0075 | 0.0059 |
| PP-97 | 13 | A | 0.929 | 0.071 | 0.8144 | 0.0638 | 0.0126 | 0.0452 | 0.0171 | 0.0146 |
| PP-102 | 14 | A | 0.961 | 0.039 | 0.9169 | 0.0209 | 0.0013 | 0.0267 | 0.0122 | 0.0048 |
| PP-105 | 14 | A | 0.937 | 0.063 | 0.8587 | 0.0421 | 0.0020 | 0.0438 | 0.0121 | 0.0126 |
| PP-106 | 14 | B | 0.930 | 0.070 | 0.8460 | 0.0441 | 0.0021 | 0.0465 | 0.0162 | 0.0135 |
| PP-110 | 14 | B | 0.870 | 0.130 | 0.7281 | 0.0661 | 0.0045 | 0.0688 | 0.0368 | 0.0366 |
| PP-112-114 | 15 | A | 0.851 | 0.149 | 0.8081 | 0.0076 | 0.0118 | 0.0017 | 0.0076 | 0.0387 |
| PP-115-117 | 15 | A | 0.963 | 0.037 | 0.9020 | 0.0351 | 0.0127 | 0.0127 | 0.0040 | 0.0096 |
| PP-124 | 16 | A | 0.982 | 0.018 | 0.9222 | 0.0371 | 0.0153 | 0.0056 | 0.0006 | 0.0088 |
| PP-127, 128 | 16 | A | 0.982 | 0.018 | 0.9159 | 0.0452 | 0.0127 | 0.0105 | 0.0001 | 0.0068 |

TABLE 3-continued

¹³C NMR data for select polypropylene examples

| | | | | | | | | | | |
|---|---|---|---|---|---|---|---|---|---|---|
| PP-131 | 16 | B | 0.981 | 0.019 | 0.9214 | 0.0415 | 0.0100 | 0.0072 | 0.0025 | 0.0058 |
| PP-134 | 16 | B | 0.963 | 0.037 | 0.8502 | 0.0618 | 0.0281 | 0.0219 | 0.0070 | 0.0166 |
| PP-136-138 | 17 | A | 0.966 | 0.034 | 0.8648 | 0.0717 | 0.0167 | 0.0138 | 0.0060 | 0.0054 |
| PP-142-144 | 18 | A | 0.977 | 0.023 | 0.8865 | 0.0684 | 0.0094 | 0.0178 | 0.0041 | 0.0026 |
| PP-145-147 | 18 | A | 0.942 | 0.058 | 0.7602 | 0.1229 | 0.0267 | 0.0428 | 0.0127 | 0.0087 |
| PP-148 | 18 | A | 0.972 | 0.028 | 0.9280 | 0.0261 | 0.0074 | 0.0049 | 0.0099 | 0.0059 |
| PP-149-151 | 18 | A | 0.940 | 0.060 | 0.8399 | 0.0353 | 0.0367 | 0.0268 | 0.0160 | 0.0127 |
| CPP-17 | C-G | B | 0.938 | 0.062 | 0.8377 | 0.0607 | 0.0068 | 0.0528 | 0.0111 | 0.0025 |
| CPP-18 | C-G | C | 0.961 | 0.039 | 0.8890 | 0.0459 | 0.0048 | 0.0362 | 0.0068 | 0.0001 |
| CPP-19 | C-G | B | 0.894 | 0.106 | 0.7293 | 0.0946 | 0.0135 | 0.0803 | 0.0227 | 0.0092 |
| CPP-20 | C-G | C | 0.921 | 0.079 | 0.7939 | 0.0752 | 0.0092 | 0.0649 | 0.0153 | 0.0050 |
| CPP-21 | C-E | B | 0.986 | 0.014 | 0.9500 | 0.0216 | 0.0064 | 0.0102 | 0.0031 | 0.0025 |
| CPP-22 | C-E | C | 0.990 | 0.010 | 0.9576 | 0.0188 | 0.0068 | 0.0077 | 0.0031 | 0.0024 |

| Ex# | rrrr | mrrr | mrrm | stereo defects/ 10000 monomer | total 2,1-regio defects/ 10000 monomer | 1,3 regio defects/ 10000 monomer | ave. meso run length |
|---|---|---|---|---|---|---|---|
| PP-34 | 0.0005 | 0.0005 | 0.0123 | 127.7 | 8.3 | 50.5 | 53.6 |
| PP-39 | 0.0047 | 0.0019 | 0.0122 | 215.0 | 0.0 | 105.4 | 31.2 |
| PP-40 | 0.0010 | 0.0024 | 0.0166 | 147.6 | 0.0 | 94.0 | 41.4 |
| PP-44 | 0.0202 | 0.0031 | 0.0170 | 381.5 | 0.0 | 74.4 | 21.9 |
| PP-46-48 | 0.0086 | 0.0155 | 0.0146 | 306.4 | 10.3 | 12.3 | 30.4 |
| PP-49-51 | 0.0092 | 0.0159 | 0.0164 | 352.7 | 0.0 | 14.4 | 27.2 |
| PP-58-60 | 0.0056 | 0.0048 | 0.0118 | 85.4 | 23.6 | 18.0 | 78.7 |
| PP-64-66 | 0.0067 | 0.0067 | 0.0094 | 271.9 | 18.7 | 12.0 | 33.0 |
| PP-67-69 | 0.0170 | 0.0085 | 0.0340 | 359.1 | 0.0 | 55.2 | 24.1 |
| PP-78 | 0.0027 | 0.0053 | 0.0269 | 395.5 | 8.0 | 90.0 | 20.3 |
| PP-79 | 0.0014 | 0.0035 | 0.0201 | 324.0 | 13.0 | 116.0 | 22.1 |
| PP-83 | 0.0015 | 0.0018 | 0.0131 | 184.5 | 15.0 | 67.0 | 37.5 |
| PP-86 | 0.0019 | 0.0036 | 0.0227 | 387.5 | 1.0 | 57.0 | 22.4 |
| PP-89 | 0.0035 | 0.0042 | 0.0253 | 385.5 | 8.0 | 92.0 | 20.6 |
| PP-92 | 0.0102 | 0.0113 | 0.0401 | 749.0 | 1.0 | 94.0 | 11.8 |
| PP-94 | 0.0019 | 0.0033 | 0.0151 | 213.5 | 12.0 | 80.0 | 32.7 |
| PP-97 | 0.0034 | 0.0054 | 0.0237 | 384.5 | 4.0 | 117.0 | 19.8 |
| PP-102 | 0.0012 | 0.0016 | 0.0144 | 218.5 | 9.0 | 50.0 | 36.0 |
| PP-105 | 0.0024 | 0.0033 | 0.0230 | 342.5 | 4.0 | 117.0 | 21.6 |
| PP-106 | 0.0026 | 0.0042 | 0.0248 | 381.0 | 4.0 | 91.0 | 21.0 |
| PP-110 | 0.0090 | 0.0099 | 0.0403 | 711.0 | 1.0 | 99.0 | 12.3 |
| PP-112-114 | 0.0665 | 0.0025 | 0.0556 | 239.9 | 0.0 | 0.0 | 41.7 |
| PP-115-117 | 0.0127 | 0.0016 | 0.0096 | 125.8 | 0.0 | 102.9 | 43.7 |
| PP-124 | 0.0040 | 0.0008 | 0.0057 | 72.9 | 17.3 | 60.8 | 66.2 |
| PP-127, 128 | 0.0032 | 0.0013 | 0.0044 | 83.4 | 4.4 | 106.0 | 51.6 |
| PP-131 | 0.0032 | 0.0023 | 0.0061 | 74.8 | 11.7 | 67.6 | 64.9 |
| PP-134 | 0.0044 | 0.0009 | 0.0091 | 213.5 | 0.0 | 93.0 | 32.6 |
| PP-136-138 | 0.0088 | 0.0029 | 0.0100 | 125.2 | 0.0 | 21.7 | 68.1 |
| PP-142-144 | 0.0029 | 0.0007 | 0.0075 | 121.7 | 16.9 | 13.4 | 65.8 |
| PP-145-147 | 0.0067 | 0.0013 | 0.0180 | 312.9 | 0.0 | 35.9 | 28.7 |
| PP-148 | 0.0069 | 0.0015 | 0.0094 | 103.6 | 0.0 | 0.0 | 96.5 |
| PP-149-151 | 0.0088 | 0.0110 | 0.0127 | 275.3 | 0.0 | 17.8 | 34.1 |
| CPP-17 | 0.0004 | 0.0010 | 0.0270 | 332.0 | 5.0 | 42.0 | 26.4 |
| CPP-18 | 0.0000 | 0.0002 | 0.0170 | 215.5 | 17.0 | 37.0 | 37.1 |
| CPP-19 | 0.0022 | 0.0039 | 0.0442 | 561.0 | 10.0 | 54.0 | 16.0 |
| CPP-20 | 0.0013 | 0.0013 | 0.0338 | 426.0 | 7.0 | 55.0 | 20.5 |
| CPP-21 | 0.0003 | 0.0010 | 0.0049 | 79.0 | 17.0 | 12.0 | 92.6 |
| CPP-22 | 0.0004 | 0.0005 | 0.0029 | 66.0 | 24.0 | 13.0 | 97.1 |

**The following polymer samples were mixed for ¹³C NMR analysis: PP-46, 47, 48; PP-49, 50, 51; PP-58, 59, 60; PP-64, 65, 66; PP67, 68, 69; PP-112, 113, 114; PP-115, 116, 117; PP-127, 128; PP-136, 137, 138; PP-142, 143, 144; PP-145, 146, 147; PP-149, 150, 151

Continuous Stirred Tank Reactor Runs:

Polymerizations were carried out in a continuous stirred tank reactor. The reactor was either a 1-liter (for ethylene-propylene copolymerization runs) or a 0.5-liter (for polypropylene runs) Autoclave reactor equipped with a stirrer, a water cooling/steam heating element with a temperature controller and a pressure controller. The reactor was maintained at a pressure in excess of the bubbling point pressure of the reactant mixture to keep the reactants in the liquid phase. The reactors were operated liquid full. Isohexane (used as the solvent), and monomers (e.g., ethylene and propylene) were purified over beds of alumina and molecular sieves. Toluene for preparing catalyst solutions was also purified by the same technique. All feeds were pumped into the reactors by a Pulsa feed pump except for the ethylene which flowed as a gas under its own pressure through a Brooks flow controller. All liquid flow rates were controlled using Brooks mass flow controller. Ethylene and propylene feeds were combined into one stream and then mixed with a pre-chilled isohexane stream that had been cooled to at least 0° C. The mixture was fed into the reactor through a single port.

An isohexane solution of tri-n-octyl aluminum (TNOA) (25 wt % in hexane, Sigma Aldrich) scavenger was added to the combined solvent and monomer stream just before it entered the reactor to further reduce any catalyst poisons.

The feed rate of the scavenger solution was adjusted in a range from 0 (no scavenger) to 1.5E-05 mole per minute to optimize catalyst activity.

The catalyst used was rac-cyclotetramethylenesilylene-bis(2,4,7-trimethylinden-1-yl)hafnium dimethyl (2). The catalyst was activated with N,N-dimethylanilinium tetrakis (heptafluoro-2-naphthyl)borate (C) at a molar ratio of about 1:1 in 900 ml of toluene. The catalyst solution was then fed into the reactor through a separate port using an ISCO syringe pump.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. The detailed polymerization process conditions are listed in Table 4 for polypropylene runs and in Tables 5 and 6 for ethylene-propylene copolymerization runs. The scavenger feed rate and catalyst feed rate were adjusted to reach the targeted conversion listed. All the reactions were carried out at a pressure of about 2.4 MPa/g unless otherwise mentioned.

TABLE 4

Continuous stirred tank reactor runs making polypropylene

| Example | PP-152 | PP-153 | PP-154 |
|---|---|---|---|
| Rxr T (C) | 130 | 110 | 90 |
| Catalyst/Activator | 2/C | 2/C | 2/C |
| Cat (mol/min) | 2.754E−07 | 2.754E−07 | 2.754E−07 |
| Scavenger (mol/min) | 4.127E−06 | 4.127E−06 | 4.127E−06 |
| Propylene (g/min) | 14 | 14 | 14 |
| polymer made (g) | 136.5 | 154.6 | 229.9 |
| Conversion (%) | 48.8 | 55.2 | 82.1 |
| Viscosity @190° C. (cp) | 18 | 118 | 1380 |
| Mn_DRI (g/mol) | 1776 | 5222 | 13421 |
| Mw_DRI (g/mol) | 4136 | 13057 | 45422 |
| Mz_DRI (g/mol) | 7729 | 23260 | 89128 |
| MWD (Mw/Mn) | 2.33 | 2.5 | 3.38 |
| Mn_LS (g/mol) | 3120 | 6152 | 15937 |
| Mw_LS (g/mol) | 4515 | 12438 | 48262 |
| Mz_LS (g/mol) | 9866 | 23552 | 106473 |
| g'vis | 0.792 | 0.892 | 0.769 |
| Tc (° C.) | 85.37 | 101.8 | 102.6 |
| Tm (° C.) | 119.17 | 135.46 | 138.02 |
| delta H (J/g) | 74.34 | 95.43 | 94.91 |
| vinyl % | 89.5 | 88.3 | 82.4 |
| Vinyls/1000 C. | 5.78 | 1.89 | 0.7 |
| Vinylenes/1000 C. | 0.08 | 0.04 | 0 |
| Vinylidenes/1000 C. | 0.37 | 0.11 | 0.06 |
| trisubstituted olefin/1000 C. | 0.23 | 0.1 | 0.09 |

*Conversion % = [(polymer yield)/( ethylene feed + propylene feed)] × 100

TABLE 5

Reactor conditions for continuous stirred tank teactor runs making ethylene-propylene copolymers

| Ex# | Tp (° C.) | Reactor Pressure (psig) | Isohexane (g/min) | C3 (g/min) | C2 (SLPM) | Cat (micromol/min) | Polymer made (gram) | Conversion (%)* | C2 conversion (%)* | C3 conversion (%)* |
|---|---|---|---|---|---|---|---|---|---|---|
| EP-55 | 100 | 350 | 55.2 | 14 | 0.3 | 0.220 | 144.6 | 50.4 | 80.5 | 49.7 |
| EP-56 | 100 | 350 | 55.2 | 14 | 0.5 | 0.184 | 136.5 | 46.9 | 73.1 | 45.8 |
| EP-57 | 100 | 350 | 55.2 | 14 | 0.7 | 0.147 | 149.1 | 50.4 | 73.4 | 49.1 |
| EP-58 | 100 | 350 | 55.2 | 14 | 0.9 | 0.147 | 150.1 | 50.0 | 66.6 | 48.8 |
| EP-59 | 100 | 350 | 55.2 | 14 | 1.2 | 0.147 | 955.6 | 51.9 | 69.6 | 50.2 |
| EP-60 | 100 | 350 | 55.2 | 14 | 1.5 | 0.147 | 975.5 | 51.8 | 71.6 | 49.4 |
| EP-61 | 70 | 350 | 55.2 | 14 | 0.3 | 0.220 | 235.4 | 82.1 | 95.8 | 81.8 |
| EP-62 | 70 | 350 | 55.2 | 14 | 0.5 | 0.184 | 261.2 | 89.7 | 122.9 | 88.4 |
| EP-63 | 70 | 350 | 55.2 | 14 | 0.7 | 0.147 | 276.8 | 93.6 | 103.0 | 93.1 |
| EP-64 | 70 | 350 | 55.2 | 14 | 0.9 | 0.147 | 264.0 | 87.9 | 115.2 | 85.9 |
| EP-65 | 70 | 350 | 55.2 | 14 | 1.2 | 0.147 | 265.0 | 86.3 | 70.4 | 87.8 |
| EP-66 | 70 | 350 | 55.2 | 14 | 1.5 | 0.147 | 309.1 | 98.5 | 96.3 | 98.8 |
| EP-67 | 70 | 350 | 55.2 | 14 | 0.9 | 0.064 | 252.8 | 84.2 | 84.1 | 84.2 |
| EP-68 | 70 | 350 | 55.2 | 14 | 0.9 | 0.039 | 186.9 | 62.2 | 69.2 | 61.7 |

*Conversion % = (polymer yield)/(ethylene feed + propylene feed) × 100; C2 conversion % = (polymer yield* ethylene content in polymer)/ethylene feed; C3 Conversion × 100; C3% = (polymer yield*propylene content in polymer)/propylene feed × 100

TABLE 6

Polymer characterization for continuous stirred tank reactor runs making ethylene-propylene copolymers

| Ex# | MFR | Mn_DRI (g/mol) | Mw_DRI (g/mol) | Mz_DRI (g/mol) | MWD (Mw/Mn) | Mn_LS (g/mol) | Mw_LS (g/mol) |
|---|---|---|---|---|---|---|---|
| EP-55 | | 7,303 | 24,707 | 46,460 | 3.38 | | |
| EP-56 | | 9,675 | 28,844 | 52,013 | 2.98 | | |
| EP-57 | | 11,275 | 32,701 | 59,160 | 2.90 | | |
| EP-58 | | 11,602 | 31,085 | 55,150 | 2.68 | | |
| EP-59 | | 12,713 | 35,627 | 64,113 | 2.80 | | |
| EP-60 | | 14,284 | 39,036 | 70,041 | 2.73 | | |
| EP-61 | 49.5 | 66,216 | 219,352 | 467,440 | 3.31 | 91,519 | 263,226 |
| EP-62 | 30.7 | 73,270 | 227,591 | 454,742 | 3.11 | 98,212 | 287,124 |
| EP-63 | 20.6 | 66,330 | 232,080 | 489,332 | 3.50 | 94,544 | 279,874 |
| EP-64 | 22.0 | 72,201 | 234,559 | 481,610 | 3.25 | 95,998 | 293,704 |
| EP-65 | 12.4 | 78,735 | 242,525 | 504,757 | 3.08 | 104,616 | 297,373 |
| EP-66 | 80.3 | 52,778 | 238,633 | 516,042 | 4.52 | 78,451 | 368,579 |

TABLE 6-continued

Polymer characterization for continuous stirred tank reactor runs making ethylene-propylene copolymers

| | | | | | | | |
|---|---|---|---|---|---|---|---|
| EP-67 | 39.4 | 58,002 | 202,052 | 420,842 | 3.48 | 82,078 | 270,159 |
| EP-68 | 13.8 | 78,980 | 205,673 | 394,974 | 2.60 | 101,147 | 243,200 |

| Ex# | Mz_LS (g/mol) | $g'_{vis}$ | Tm (° C.) | Tg (° C.) | delta H (J/g) | Ethylene (wt %) | Vinyls/ 1000 C. | vinyl % |
|---|---|---|---|---|---|---|---|---|
| EP-55 | | | 117.3 | | 73.2 | 3.78 | 1.61 | 93.6 |
| EP-56 | | | 105.1 | −21.5 | 57.5 | 6.05 | 1.34 | 88.2 |
| EP-57 | | | 97.4 | −23.7 | 51.1 | 7.80 | 1.02 | 77.3 |
| EP-58 | | | 87.5 | −27.1 | 43.4 | 9.03 | 1.04 | 85.2 |
| EP-59 | | | 73.1 | −37.0 | 35.7 | 11.85 | 0.91 | 85.0 |
| EP-60 | | | 56.1 | −36.1 | 25.4 | 14.94 | 0.84 | 85.7 |
| EP-61 | 520,510 | 0.740 | 130.0 | | 74.3 | 2.76 | | |
| EP-62 | 599,668 | 0.747 | 119.0 | | 65.4 | 5.32 | | |
| EP-63 | 594,507 | 0.808 | 109.7 | | 58.7 | 5.89 | | |
| EP-64 | 612,329 | 0.750 | 87.0 | | 40.4 | 8.88 | | |
| EP-65 | 606,298 | 0.762 | 100.9 | | 49.6 | 7.21 | | |
| EP-66 | 913,528 | 0.559 | 77.1 | −30.4 | 38.5 | 10.57 | | |
| EP-67 | 588,915 | 0.707 | 101.7 | −22.3 | 56.9 | 6.77 | 0.18 | 38.3 |
| EP-68 | 458,835 | 0.867 | 99.3 | −23.1 | 49.2 | 7.54 | 0.14 | 46.7 |

All documents described herein are incorporated by reference herein, including any priority documents and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A process for polymerization, comprising:
   (i) contacting one or more monomers comprising propylene and optionally ethylene, with a catalyst system comprising a metallocene catalyst compound and an activator, wherein the metallocene catalyst compound is represented by the formula:

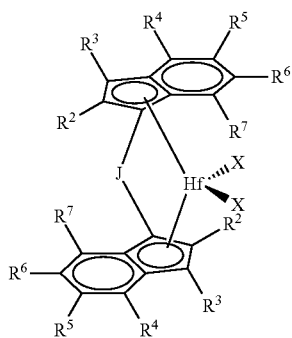

where each $R^3$ is hydrogen; each $R^4$ is independently a $C_1$-$C_{10}$ alkyl; each $R^2$ and $R^7$ is independently hydrogen or $C_1$-$C_{10}$ alkyl; each $R^5$ and $R^6$ is independently hydrogen, $C_1$-$C_{50}$ substituted or unsubstituted hydrocarbyl, or $C_1$-$C_{50}$ substituted or unsubstituted halocarbyl; and $R^4$ and $R^5$, $R^5$ and $R^6$ and/or $R^6$ and $R^7$ are optionally bonded together to form a ring structure; J is a bridging group represented by the formula $R^a{}_2J'$, where J' is C or Si, and each $R^a$ is, independently, $C_1$ to $C_{20}$ substituted or unsubstituted hydrocarbyl, and the two $R^a$ form a cyclic structure incorporating J' and the cyclic structure is optionally a saturated or partially saturated cyclic or fused ring system; and each X is a univalent anionic ligand, or two Xs are joined and bound to the metal atom to form a metallocycle ring, or two Xs are joined to form a chelating ligand, a diene ligand, or an alkylidene ligand; and (ii) obtaining a polymer having: 1) greater than 40% vinyl chain ends, relative to the total unsaturated chain ends, 2) a Tm of 70° C. or more; 3) an Mw of 3000 to 300,000 g/mol, and 4) a $g'_{vis}$ of 0.90 or less.

2. The process of claim 1, wherein step (i) occurs at a temperature of greater than 60° C.

3. The process of claim 1, wherein the polymer produced has 1) greater than 70% vinyl chain ends, relative to total unsaturated chain ends, and 2) an Mw of 3000 to 200,000 g/mol.

4. The process of claim 1, wherein the polymer produced is isotactic polypropylene having a Tm of 115° C. or more.

5. The process of claim 1, wherein the polymer produced is a propylene-ethylene copolymer containing 30 wt % or less of ethylene.

6. The process of claim 1, wherein the polyolefin produced has a $g'_{vis}$ of 0.85 or less.

7. The process of claim 1, wherein the polyolefin produced has at least X % vinyl chain ends (relative to total unsaturations as measured by $^1$H NMR, where X=47.8*$g'_{vis}$+45.1.

8. The process of claim 1 wherein $R^2$, $R^4$ and $R^7$ are, independently, selected from the group consisting of methyl, ethyl, propyl, butyl, pentyl, heptyl, hexyl, octyl, nonyl, decyl and an isomers thereof.

9. The process of claim 1 wherein $R^2$ and $R^4$ are, independently, a $C_1$ to $C_{10}$ alkyl.

10. The process of claim 1 wherein $R^4$ and $R^7$ are, independently, a $C_1$ to $C_{10}$ alkyl.

11. The process of claim 1 wherein each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof and two X's optionally form a part of a fused ring or a ring system.

12. The process of claim 1 wherein J is represented by the formula:

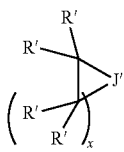

wherein J' is a carbon or silicon atom, x is 1, 2, 3, or 4, and each R' is, independently, hydrogen or $C_1$-$C_{10}$ hydrocarbyl.

13. The process of claim 1 wherein J is cyclopentamethylenesilylene, cyclotetramethylenesilylene, cyclotrimethylenesilylene.

14. The process of claim 1 wherein the activator comprises alumoxane.

15. The process of claim 1 wherein alumoxane is present at a molar ratio of aluminum to catalyst compound transition metal of 100:1 or more.

16. The process of claim 1 wherein the activator comprises a non-coordinating anion activator.

17. The process of claim 1 wherein activator is represented by the formula:

wherein Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3.

18. The process of claim 1 wherein activator is represented by the formula:

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

19. The process of claim 1 wherein the activator is one or more of:
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
N,N-dimethylanilinium tetrakis(perfluoronaphthyl)borate,
N,N-diethylanilinium tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate, triphenylphosphonium tetrakis(3,5-bis(trifluoromethyl) phenyl)borate,
triethylsilylium tetrakis(3,5-bis(trifluoromethyl)phenyl) borate,
benzene(diazonium) tetrakis(3,5-bis(trifluoromethyl)phenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

20. The process of claim 1 wherein the process occurs at a temperature of from about 0° C. to about 300° C., at a pressure in the range of from about 0.35 MPa to about 10 MPa, and at a time up to 300 minutes.

21. The process of claim 1 further comprising obtaining polymer having at least 90% allyl chain ends.

22. The process of claim 1 wherein the monomers comprise ethylene and propylene.

* * * * *